(12) United States Patent
Kobayashi

(10) Patent No.: US 9,448,625 B2
(45) Date of Patent: Sep. 20, 2016

(54) HEAD-MOUNTED DISPLAY DEVICE, CONTROL METHOD FOR HEAD-MOUNTED DISPLAY DEVICE, AND IMAGE DISPLAY SYSTEM

(71) Applicant: Seiko Epson Corporation, Tokyo (JP)

(72) Inventor: Shinichi Kobayashi, Azumino (JP)

(73) Assignee: Seiko Epson Corporation, Tokyo (JP)

( * ) Notice: Subject to any disclaimer, the term of this patent is extended or adjusted under 35 U.S.C. 154(b) by 62 days.

(21) Appl. No.: 14/153,598

(22) Filed: Jan. 13, 2014

(65) Prior Publication Data
US 2014/0198033 A1 Jul. 17, 2014

(30) Foreign Application Priority Data

Jan. 15, 2013 (JP) .................... 2013-004485

(51) Int. Cl.
G09G 5/00 (2006.01)
G06F 3/01 (2006.01)
G02B 27/01 (2006.01)
G02B 27/00 (2006.01)

(52) U.S. Cl.
CPC ........... *G06F 3/012* (2013.01); *G02B 27/0093* (2013.01); *G02B 27/017* (2013.01); *G02B 2027/014* (2013.01)

(58) Field of Classification Search
None
See application file for complete search history.

(56) References Cited

U.S. PATENT DOCUMENTS 6,456,262 B1 * 9/2002 Bell .................................. 345/8
2007/0171191 A1 * 7/2007 Sohn et al. .................. 345/156
2010/0207873 A1 * 8/2010 Lee ............................... 345/156
2011/0001695 A1    1/2011 Suzuki et al.
(Continued)

FOREIGN PATENT DOCUMENTS

| IL | WO20121047892 A2 * | 8/2012 |
|---|---|---|
| JP | 2011-14082 A | 1/1920 |
| JP | 2011-91789 A | 5/2011 |
| JP | 2012-165084 A | 8/2012 |

OTHER PUBLICATIONS

Kozma, et al., Gazir: Gaze-Based Zooming Interface for Image Retrieval, Proceedings of 11th Conference on Multimodal Interfaces and the Sixth Workshop on Machine Learning for Multimodal Interaction, 2009.*

(Continued)

*Primary Examiner* — Ilana Spar
*Assistant Examiner* — Kirk Hermann
(74) *Attorney, Agent, or Firm* — ALG Intellectual Property, LLC

(57) ABSTRACT

A head-mounted display device of a transmission type includes an operation unit, a control unit configured to transmit image data, and an image display unit configured to cause a user to visually recognize a generated image generated on the basis of the transmitted image data from the control unit. The control unit has, as an operation mode of the image display unit, a first mode for causing the user to visually recognize a plurality of selectable images in positions other than the center in an image generable region, which is a region where the image display unit can generate the generated image, and a second mode for causing, when a singularity of the selectable image is selected out of the plurality of selectable images, the user to visually recognize an associated image associated with the one selectable image as an image larger than the one selectable image in the first mode.

14 Claims, 12 Drawing Sheets

(56) References Cited

U.S. PATENT DOCUMENTS

| | | | |
|---|---|---|---|
| 2011/0197156 A1* | 8/2011 | Strait | G06F 3/0481 715/771 |
| 2012/0019662 A1* | 1/2012 | Maltz | 348/158 |
| 2012/0027373 A1* | 2/2012 | Chuang et al. | 386/230 |
| 2012/0200478 A1 | 8/2012 | Kobayashi | |
| 2013/0128364 A1* | 5/2013 | Wheeler et al. | 359/630 |

OTHER PUBLICATIONS

Merriam Webster's Dictionary definition of field, www.merriam-webster.com/dictionary/field, p. 1.*

Merriam Webster's Dictionary definition of visual field, www.merriam-webster.com/dictionary/visual%20field, p. 1.*

* cited by examiner

HEAD-MOUNTED DISPLAY DEVICE, CONTROL METHOD FOR HEAD-MOUNTED DISPLAY DEVICE, AND IMAGE DISPLAY SYSTEM

BACKGROUND

1. Technical Field

The present invention relates to a head-mounted display device.

2. Related Art

A head-mounted display device (a head mounted display (HMD)), which is a display device mounted on the head, is known. For example, the head-mounted display device generates image light, which represents an image, using a liquid crystal display and a light source and guides the generated image light to the eyes of a user using a projection optical system and a light guide plate to thereby cause the user to visually recognize a virtual image. As the head-mounted display device, there are two types, i.e., a transmission type with which the user can visually recognize an outside scene in addition to a virtual image and a non-transmission type with which the user cannot visually recognize the outside scene. As the head-mounted display device of the transmission type, there are an optical transmission type and a video transmission type.

JP-A-2012-165084 (Patent Literature 1) discloses a head-mounted display device that performs, when a user performs predetermined operation while visually recognizing a virtual image such as a content video, control for not irradiating light from a light source to enable the user to easily visually recognize an outside scene without causing the user to visually recognize a virtual image. JP-A-2011-91789 (Patent Literature 2) discloses a head-mounted display device that detects number-of-steps information during walking of a user and performs control of an image for causing the user to visually recognize the image as a virtual image according to the detected number-of-steps information. JP-A-2011-14082 (Patent Literature 3) discloses a device that causes, according to a motion of a user, the user to visually recognize an image representing information set in advance.

However, with the head-mounted display device disclosed in Patent Literature 1, when the user desires to visually recognize an outside scene while visually recognizing a video as a virtual image, the user can visually recognize the outside scene by performing a predetermined operation but cannot visually recognize the video that the user has been visually recognizing. Therefore, there is room of improvement in a method of causing the user to visually recognize the outside scene and the video. In the technique disclosed in Patent Literature 2, a video visually recognized by the user is controlled according to the number-of-steps information of the user. Therefore, an outside view or a video visually recognized by the user sometimes does not reflect an intention of the user. Consequently, there is room of improvement concerning the control of a video visually recognized by the user. In the technique disclosed in Patent Literature 3, the image representing the information set in advance is visually recognized by the user according to the motion of the user. However, the user sometimes cannot select, according to an intention of the user, the size and the like of the image to be visually recognized, for example, when the user desires to visually recognize the image in a larger size. Therefore, there is room of improvement in convenience for the user. Further, there is a demand that the user should visually recognize, with simpler operation, an image that reflects an intention of the user.

SUMMARY

An advantage of some aspects of the invention is to solve at least a part of the problems described above, and the invention can be implemented as the following aspects.

(1) An aspect of the invention provides a head-mounted display device of a transmission type. The head-mounted display device includes: an operation unit configured to receive operation; a control unit configured to transmit image data; and an image display unit configured to cause, in a state in which the image display unit is mounted on the head of a user, the user to visually recognize a generated image generated on the basis of the image data transmitted from the control unit. The control unit has, as an operation mode of the image display unit, a first mode for causing the user to visually recognize a plurality of selectable images in positions other than the center in an image generable region, which is a region where the image display unit can generate the generated image, and a second mode for causing, when a singularity of the selectable image is selected out of the plurality of selectable images on the basis of the operation, the user to visually recognize an associated image associated with the one selectable image as an image larger than the one selectable image in the first mode. With the head-mounted display device according to this configuration, the user can switch the operation mode of the image display unit according to an intention of the user and select an image that the user desires to view and can visually recognize an outside scene according to necessity. Therefore, convenience for the user is improved.

(2) The head-mounted display device according to the aspect of the invention may be configured such that the control unit causes the user to visually recognize, in the second mode, the associated image in a position including the center in the image generable region. With the head-mounted display device according to this configuration, the user can easily visually recognize a selected image. Therefore, convenience for the user is improved.

(3) The head-mounted display device according to the aspect of the invention may be configured such that the head-mounted display device further includes: a position detecting unit configured to detect a present position; a signal transmitting unit configured to transmit a control signal to an information apparatus when the present position detected by the position detecting unit is within a specific geographical region; and an information receiving unit configured to receive specific information transmitted from the information apparatus that receives the control signal, and at least one of a plurality of associated images associated with the plurality of selectable images is an image representing the specific information. With the head-mounted display device according to this configuration, when the user is present within the specific geographical region, a video related to the specific geographical region is transmitted. And it is possible to cause the user to visually recognize the video. Therefore, the user can visually recognize an image related to the present position according to the specified present position and convenience for the user is improved.

(4) The head-mounted display device according to the aspect of the invention may be configured such that the head-mounted display device further includes: a signal transmitting unit configured to transmit a specific signal; and an information receiving unit configured to receive the specific signal transmitted from the signal transmitting unit and, when an information apparatus determines on the basis of the specific signal that a present position of the head-mounted display device is within a specific geographical region, receive specific information transmitted by the information apparatus, and at least one of a plurality of associated images associated with the plurality of selectable images is an image representing the specific information. With the head-mounted display device according to this configuration, even if the position detecting unit is absent, a relative positional relation between the head-mounted display device and the information apparatus is visually recognized by the signal transmitting unit and the information apparatus. The signal receiving unit can receive video information transmitted from the information apparatus.

(5) The head-mounted display device according to the aspect of the invention may be configured such that the head-mounted display device further includes: a position detecting unit configured to detect a present position; and a visual-line-direction estimating unit configured to estimate a visual line direction of the user, and when the present position detected by the position detecting unit is within a specific geographical region, the control unit changes the arrangement of the selectable images in the image generable region on the basis of the visual line direction and the present position. With the head-mounted display device according to this configuration, since the arrangement of a selectable image visually recognized by the user is associated with the specific geographical region, the user can sensuously recognize a relation between a position of the selectable image and an outside scene. Therefore, convenience for the user is improved.

(6) The head-mounted display device according to the aspect of the invention may be configured such that the head-mounted display device further includes a movement detecting unit configured to detect the movement of the operation unit, and the operation is the movement of the operation unit detected by the movement detecting unit. With the head-mounted display device according to this configuration, the user can select one selectable image out of the plurality of selectable images with simple and sensuous operation without requiring complicated operation. Therefore, convenience for the user is improved.

(7) The head-mounted display device according to the aspect of the invention may be configured such that the control unit replaces, among the image data, in the first mode, a portion corresponding to a region different from a region where the selectable image is visually recognized in the image generable region with dummy data and replaces, in the second mode, a portion corresponding to a region different from a region where the associated image and the selectable image are visually recognized in the image generable region with dummy data. With the head-mounted display device according to this configuration, the user can visually recognize an outside scene without visually recognizing an unnecessary image in a portion other than the selectable image and the associated image in the image generable region. Therefore, convenience for the user is improved.

(8) The head-mounted display device according to the aspect of the invention may be configured such that the head-mounted display device further includes an image-light generating unit configured to generate image light, which represents an image, on the basis of the image data transmitted from the control unit, the image display unit emits the image light to the eyes of the user and causes the user to visually recognize the generated image, and the control unit does not cause, in the first mode, the image-light generating unit to generate the image light in a portion corresponding to a region different from a region where the selectable image is visually recognized in the image generable region and does not cause, in the second mode, the image-light-generating unit to generate the image light in a portion corresponding to a region different from a region where the associated image and the selectable image are visually recognized in the image generable region. With the head-mounted display device according to this configuration, the user can visually recognize an outside scene without visually recognizing an unnecessary image in a portion other than the selectable image and the associated image in the image generable region. Therefore, convenience for the user is improved.

(9) The head-mounted display device according to the aspect of the invention may be configured such that the control unit further generates large-region image data corresponding to a region larger than the image generable region, extracts a part of the large-region image data, and transmits image data for visual recognition corresponding to a region having size equal to or smaller than the size of the image generable region to the image display unit. With the head-mounted display device according to this configuration, the associated image associated with the selectable image is created by the control unit as one image data. Therefore, when a specific selectable image is selected out of the plurality of selectable images, it is unnecessary to receive an image transmitted from an information apparatus every time the specific selectable image is selected. It is possible to quickly generate a generated image in the image generable region from the associated image. Therefore, convenience for the user is improved.

(10) The head-mounted display device according to the aspect of the invention may be configured such that the image data for visual recognition is image data corresponding to a region having size same as the size of the image generable region. With the head-mounted display device according to this configuration, the user can visually recognize the selected associated image in largest size same as the size of the image generable region without performing unnecessary operation.

(11) The head-mounted display device according to the aspect of the invention may be configured such that the control unit arranges, in the first mode, the selectable image in a peripheral section in the image generable region and arranges, in the second mode, the selectable image in the peripheral section in the image generable region and arranges the associated image in a position including the center other than the peripheral section in the image generable region. With the head-mounted display device according to this configuration, in the first mode, the user can visually recognize an outside scene in the center of a visual field and visually recognize the selectable image in a position other than the center. Further, in the second mode, the user can visually recognize both of the plurality of selectable images and the associated image associated with the selected selectable image at a time. Therefore, convenience for the user is improved.

(12) The head-mounted display device according to the aspect of the invention may be configured such that the control unit causes, in the second mode, the image display unit to display the one selectable image associated with the associated image arranged in the image generable region to be different from the other selectable images. With the head-mounted display device according to this configuration, in the second mode, the user can easily recognize a relation between the selectable image and the associated image associated with the selected selectable image. Therefore, convenience for the user is further improved.

(13) The head-mounted display device according to the aspect of the invention may be configured such that the control unit has, as the operation mode, a third mode for arranging the associated image to be a region having size same as the size of the image generable region, the first mode, and the second mode. With the head-mounted display device according to this configuration, the associated image is displayed in the entire image generable region in the third mode. Therefore, a range of selection increases with respect to the size of the generated image generated in the image generable region and convenience for the user is further improved.

(14) Another aspect of the invention provides an image display system including: an information apparatus; and a head-mounted display device of a transmission type that causes a user to visually recognize an image representing specific information transmitted from the information apparatus. In the image display system, the head-mounted display device includes: a position detecting unit configured to detect a present position; and a signal transmitting unit configured to transmit a control signal to the information apparatus when the present position detected by the position detecting unit is within a specific geographical region. Upon receiving the control signal transmitted from the signal transmitting unit, the information apparatus transmits the specific information to the head-mounted display device. The head-mounted display device further includes: an information receiving unit configured to receive the specific information transmitted from the information apparatus; and a control unit configured to switch an operation mode for causing the user to visually recognize an image between a first mode for causing the user to visually recognize a plurality of selectable images in positions other than the center in an image generable region, which is a region where the head-mounted display device can generate the image and a second mode for causing, when a singularity of the selectable image is selected out of the plurality of selectable images on the basis of the operation, the user to visually recognize an associated image associated with the one selectable image and representing the specific information as an image larger than the one selectable image in the first mode. According to this configuration, the user can switch the operation mode of the image display unit according to an intention of the user and select the associated image representing the specific information transmitted from the information apparatus and can visually recognize an outside scene according to necessity. Therefore, convenience for the user is improved.

Not all of the plurality of components included in the aspects of the invention explained above are essential. In order to solve a part or all of the problems or in order to attain a part or all of the effects described in this specification, it is possible to appropriately perform, concerning a part of the plurality of components, a change, deletion, replacement with new other components, and partial deletion of limitation contents of the components. In order to solve a part or all of the problems or in order to attain a part or all of the effects described in this specification, it is also possible to combine a part or all of the technical features included in one aspect of the invention explained above with a part or all of the technical features included in the other aspect of the invention explained above to form an independent one aspect of the invention.

For example, an aspect of the invention can be implemented as a device including one or more or all of the three elements: the operation unit, the control unit, and the image display unit. That is, the device may include or may not include the operation unit. The device may include or may not include the control unit. The device may include or may not include the image display unit. For example, the operation unit may receive operation. For example, the control unit may transmit image data. The control unit may have, as the operation mode of the image display unit, a first mode for causing the user to visually recognize a plurality of selectable images in positions other than the center in an image generable region, which is a region where the image display unit can generate a generated image and a second mode for causing, when a singularity of the selectable image is selected out of the plurality of selectable images on the basis of the operation, the user to visually recognize an associated image associated with the one selectable image as an image larger than the one selectable image in the first mode. In a state in which the device is mounted on the head of the user, the image display unit may cause the user to visually recognize a generated image generated on the basis of image data transmitted from the control unit. Such a device can be implemented as, for example, a head-mounted display device. However, the device can also be implemented as devices other than the head-mounted display device. According to such a mode, it is possible to attain at least one of various objects such as improvement and simplification of operability of the device, integration of the device, and improvement of convenience for the user who uses the device. A part or all of the technical features of the aspects of the head-mounted display device can be applied to the device.

The invention can be implemented in various forms other than the head-mounted display device. For example, the invention can be implemented in forms of a control method for the head-mounted display device, a head-mounted display system, a computer program for implementing functions of the head-mounted display system, a recording medium having the computer program recorded therein, a data signal including the computer program and embodied in a carrier wave.

BRIEF DESCRIPTION OF THE DRAWINGS

The invention will be described with reference to the accompanying drawings, wherein like numbers reference like elements.

DESCRIPTION OF EXEMPLARY EMBODIMENTS

Modes for carrying out the invention are explained in the following order on the basis of embodiment.
A. Embodiment
A-1. Configuration of a video display system
A-2. Configuration of a head-mounted display device
A-3. Delivered image display processing
B. Modifications

A. Embodiment

A-1. Configuration of a Video Display System

Figure 1:
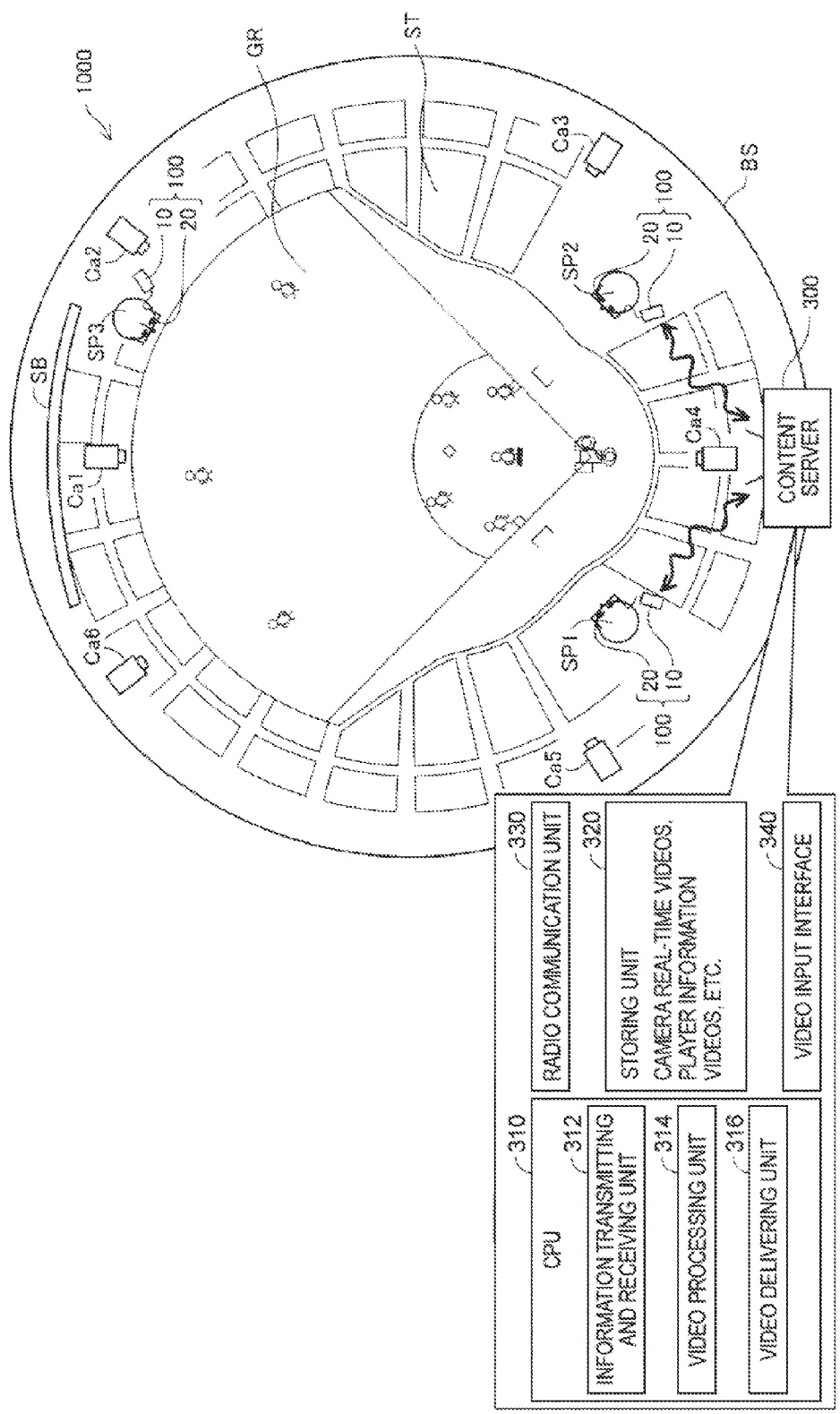
FIG. 1 is an explanatory diagram showing the schematic configuration of a video display system in an embodiment of the invention.

FIG. 1 is an explanatory diagram showing the schematic configuration of a video display system 1000 in an embodiment of the invention. The video display system 1000 is a system applied to a baseball stadium BS. In an example shown in FIG. 1, a spectator SP wearing a head-mounted display device 100 (details of which are explained below) is watching a baseball game in a stand ST provided around a ground GR of the baseball stadium BS.

The video display system 1000 includes a content server 300. The content server 300 includes a CPU 310, a storing unit 320, a radio communication unit 330, and a video input interface 340. The storing unit 320 is configured by, for example, a ROM, a RAM, a DRAM, and a hard disk. The CPU 310 reads out and executes a computer program stored in the storing unit 320 to thereby function as an information transmitting and receiving unit 312, a video processing unit 314, and a video delivering unit 316. The radio communication unit 330 performs radio communication between the content server 300 and the head-mounted display device 100 present in the baseball stadium BS according to a predetermined radio communication standard such as a wireless LAN or a Bluetooth. The radio communication between the content server 300 and the head-mounted display device 100 may be executed via a communication apparatus (e.g., a wireless LAN access point) functioning as a separate apparatus connected to the content server 300. In the case, the radio communication unit 330 of the content server 300 can be omitted. The content server 300 is set in an arbitrary place on the inside or the outside of the baseball stadium BS as long as the content server 300 can perform the radio communication with the head-mounted display device 100 present in the baseball stadium BS.

In the baseball stadium BS, a plurality of cameras Ca for photographing various objects (the ground GR, players, the stand ST, spectators, a scoreboard SB, etc.) in the baseball stadium BS are set. For example, in the example shown in FIG. 1, a camera Ca4 is set near the stand behind the backstop of the baseball stadium BS, cameras Ca3 and Ca5 are set near the infield stands, and cameras Ca1, Ca2, and Ca6 are set near the outfield bleachers. The number and the arrangement of cameras Ca set in the baseball stadium BS can be changed arbitrarily. The cameras Ca and the content server 300 are connected via a cable and, if necessary, a relaying apparatus. Videos photographed by the cameras Ca are input to the video input interface 340 of the content server 300. The video processing unit 314 of the content server 300 executes processing such as compression on the input videos according to necessity and stores the input videos in the storing unit 320 as real-time videos of the cameras Ca. The real-time videos are videos for substantial live broadcasting for the head-mounted display device 100. The video processing unit 314 creates a replay video from an input video and stores the replay video in the storing unit 320. The replay video is a video representing a scene (a highlight scene) in a predetermined time before the present. In this embodiment, information concerning players (player names, team names, positions, results, and the like) and information concerning the baseball stadium BS (a stadium name, a seating capacity, the number of spectators, a weather condition, and the like) are stored in the storing unit 320 in advance. The connection between the cameras Ca and the content server 300 may be connection by radio rather than wire.

A-2. Configuration of the Head-Mounted Display Device

Figure 2:
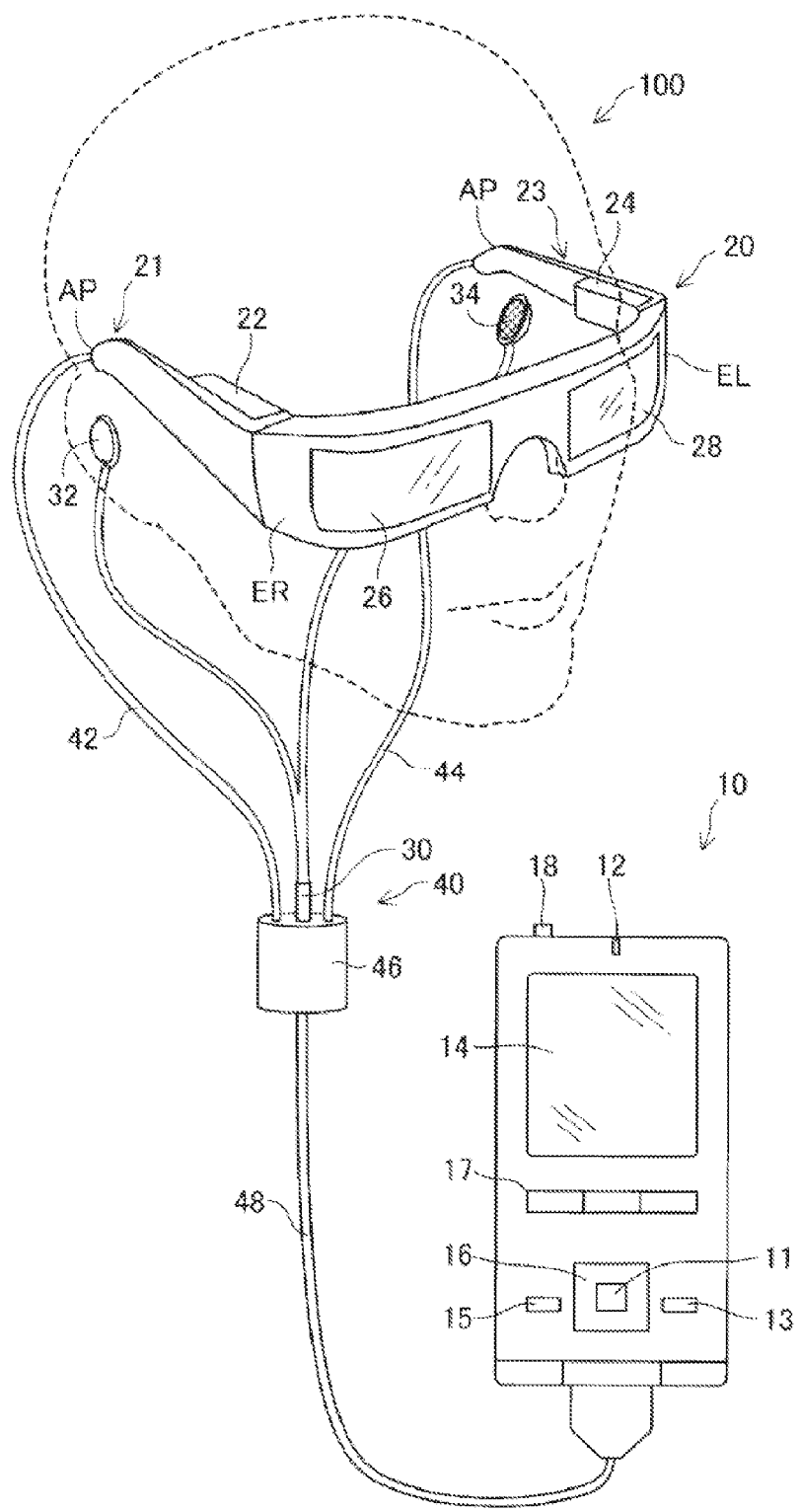
FIG. 2 is an explanatory diagram showing the external configuration of a head-mounted display device.

FIG. 2 is an explanatory diagram showing the external configuration of the head-mounted display device 100. The head-mounted display device 100 is a display device mounted on the head and is also called as head mounted display (HMD). The head-mounted display device 100 in this embodiment is a head-mounted display device of an optical transmission type that enables a user to visually recognize a virtual image and at the same time directly visually recognize an outside scene. In this specification, the virtual image visually recognized by the user using the head-mounted display device 100 is also referred to as "display image" for convenience. Emitting the image light generated on the basis of the image data is also referred to as "display an image".

The head-mounted display device 100 includes an image display unit 20 configured to cause the user to visually recognize the virtual image in a state in which the head-mounted display device 100 is mounted on the head of the user and a control unit 10 (a controller 10) configured to control the image display unit 20.

The image display unit 20 is a mounted body mounted on the head of the user. In this embodiment, the image display unit 20 has an eyeglass shape. The image display unit 20 includes a right holding unit 21, a right display driving unit 22, a left holding unit 23, a left display driving unit 24, a right optical-image display unit 26, and a left optical-image display unit 28. The right optical-image display unit 26 and the left optical-image display unit 28 are respectively arranged to be located in front of the right and left eyes of the user when the user wears the image display unit 20. One end of the right optical-image display unit 26 and one end of the left optical-image display unit 28 are connected to each other in a position corresponding to the area between the eyebrows of the user when the user wears the image display unit 20.

The right holding unit 21 is a member provided to extend from an end ER, which is the other end, of the right optical-image display unit 26 to a position corresponding to the temporal region of the user when the user wears the image display unit 20. Similarly, the left holding unit 23 is a member provided to extend from an end EL, which is the other end, of the left optical-image display unit 28 to a position corresponding to the temporal region of the user when the user wears the image display unit 20. The right holding unit 21 and the left holding unit 23 hold the image display unit 20 on the head of the user like temples of eyeglasses.

The right display driving unit 22 and the left display driving unit 24 are arranged on sides opposed to the head of the user when the user wears the image display unit 20. In the following explanation, the right holding unit 21 and the left holding unit 23 are collectively simply referred to as "holding unit" as well. The right display driving unit 22 and the left display driving unit 24 are collectively simply referred to as "display driving unit" as well. The right optical-image display unit 26 and the left optical-image display unit 28 are collectively simply referred to as "optical-image display unit" as well.

The display driving units 22 and 24 include liquid crystal displays 241 and 242 (hereinafter referred to as "LCDs 241 and 242" as well) and projection optical systems 251 and 252 (see FIG. 3). Details of the configuration of the display driving units 22 and 24 are explained below. The optical-image display units 26 and 28 functioning as optical members include light guide plates 261 and 262 (see FIG. 3) and dimming plates. The light guide plates 261 and 262 are formed of a light transmissive resin material or the like and guide image light output from the display driving units 22 and 24 to the eyes of the user. The dimming plates are thin plate-like optical elements and are arranged to cover the front side of the image display unit 20, which is the opposite side of the eyes of the user. The dimming plates protect the light guide plates 261 and 262 and suppress, for example, damage to the light guide plates 261 and 262 and adhesion of stains to the light guide plates 261 and 262. It is possible to adjust an external light amount entering the eyes of the user and adjust easiness of visual recognition of a virtual image by adjusting the light transmittance of the dimming plates. The dimming plates can be omitted.

The image display unit 20 further includes a connecting unit 40 for connecting the image display unit 20 to the control unit 10. The connecting unit 40 includes a main body cord 48 connected to the control unit 10, a right cord 42, a left cord 44, and a coupling member 46. The right cord 42 and the left cord 44 are cords branching from the main body cord 48. The right cord 42 is inserted into a housing of the right holding unit 21 from a distal end portion AP in the extending direction of the right holding unit 21 and connected to the right display driving unit 22. Similarly, the left cord 44 is inserted into a housing of the left holding unit 23 from a distal end portion AP in the extending direction of the left holding unit 23 and connected to the left display driving unit 24. The coupling member 46 is provided at a branch point of the main body cord 48, the right cord 42, and the left cord 44 and includes a jack for connecting an earphone plug 30. A right earphone 32 and a left earphone 34 extend from the earphone plug 30.

The image display unit 20 and the control unit 10 perform transmission of various signals via the connecting unit 40. Connectors (not shown in the figures), which fit with each other, are respectively provided in an end portion on the opposite side of the coupling member 46 in the main body cord 48 and the control unit 10. The control unit 10 and the image display unit 20 are connected and disconnected according to fitting and unfitting of the connector of the main body cord 48 and the connector of the control unit 10. As the right cord 42, the left cord 44, and the main body cord 48, for example, a metal cable or an optical fiber is adopted.

The control unit 10 is a device for controlling the head-mounted display device 100. The control unit 10 includes a determination key 11, a lighting unit 12, a display switching key 13, a track pad 14, a luminance switching key 15, a direction key 16, a menu key 17, and a power switch 18. The determination key 11 detects pressing operation and outputs a signal for determining content of operation by the control unit 10. The lighting unit 12 notifies, with a light emitting state thereof, an operation state of the head-mounted display device 100. As the operation state of the head-mounted display device 100, for example, there is ON/OFF of a power supply. As the lighting unit 12, for example, an LED (Light Emitting Diode) can be used. The display switching key 13 detects pressing operation and outputs a signal for switching, for example, a display mode of a content moving image to 3D and 2D. The track pad 14 detects operation of a finger of the user on an operation surface of the track pad 14 and outputs a signal corresponding to detection content. As the track pad 14, various track pads of an electrostatic type, a pressure detection type, and an optical type can be adopted. The luminance switching key 15 detects pressing operation and outputs a signal for increasing or decreasing the luminance of the image display unit 20. The direction key 16 detects pressing operation of keys corresponding to up, down, left, and right directions and outputs a signal corresponding to detection content. The power switch 18 detects slide operation of the switch to switch a state of the power supply for the head-mounted display device 100.

Figure 3:
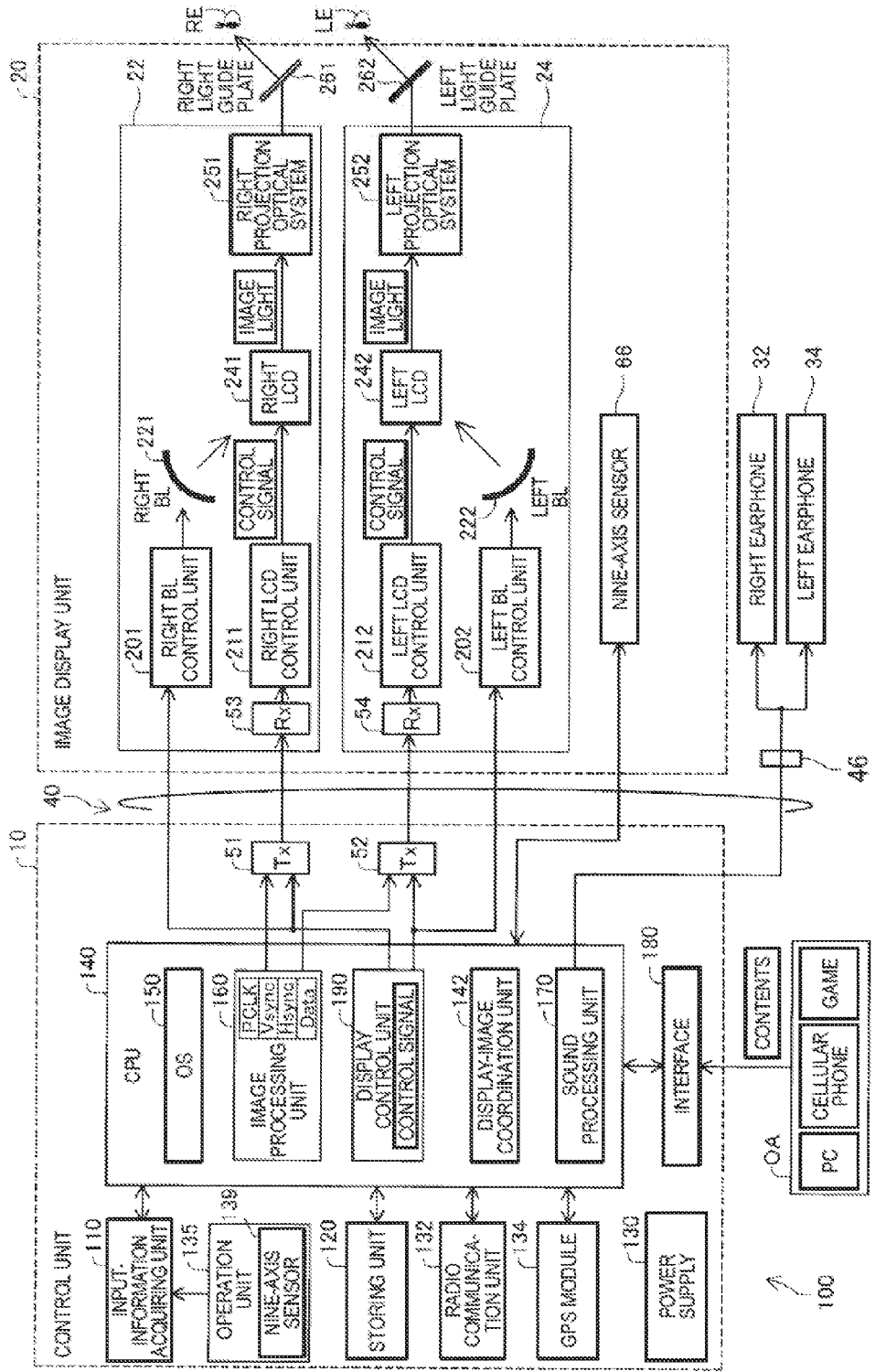
FIG. 3 is a block diagram functionally showing the configuration of the head-mounted display device.

FIG. 3 is a block diagram functionally showing the configuration of the head-mounted display device 100. The control unit 10 includes an input-information acquiring unit 110, a storing unit 120, a power supply 130, a radio communication unit 132, a GPS module 134, an operation unit 135, a CPU 140, an interface 180, and a transmitting unit 51 (Tx 51) and a transmitting unit 52 (Tx 52), which are connected to one another by a not-shown bus. The operation unit 135 receives operation by the user. The operation unit 135 includes the determination key 11, the display switching key 13, the track pad 14, the luminance switching key 15, the direction key 16, the menu key 17, the power switch 18, and a nine-axis sensor 139. The nine-axis sensor 139 is a motion sensor for detecting acceleration (three axes), angular velocity (three axes), and terrestrial magnetism (three axes). Since the nine-axis sensor 139 is provided in the operation unit 135, the nine-axis sensor 139 functions as a movement detecting unit configured to detect the movement of the operation unit 135 by the user. The movement of the operation unit 135 includes speed, acceleration, angular velocity, direction, and a change in the direction of the head.

The input-information acquiring unit 110 acquires a signal corresponding to an operation input to the operation unit 135. The storing unit 120 is configured by a ROM, a RAM, a DRAM, a hard disk, and the like. The power supply 130 supplies electric power to the units of the head-mounted display device 100. As the power supply 130, for example, a secondary battery can be used. The radio communication unit 132 performs radio communication with other apparatuses such as the content server 300 according to a predetermined radio communication standard such as a wireless LAN or a Bluetooth. The GPS module 134 detects the present position of the GPS module 134 by receiving a signal from a GPS satellite. When the present position of the GPS module 134 is detected, the present position of the user of the head-mounted display device 100 is specified.

The CPU 140 reads out and executes a computer program stored in the storing unit 120 to thereby function as an operating system 150 (OS 150), an image processing unit 160, a sound processing unit 170, a display control unit 190, and a display-image coordination unit 142.

The image processing unit 160 generates a clock signal PCLK, a vertical synchronization signal VSync, a horizontal synchronization signal HSync, and image data Data on the basis of contents (a video) input via the interface 180 or the radio communication unit 132. The image processing unit 160 supplies the signals to the image display unit 20 via the connecting unit 40. Specifically, the image processing unit 160 acquires an image signal included in the contents. For example, in the case of a moving image, in general, the acquired image signal is an analog signal formed by thirty frame images per second. The image processing unit 160 separates synchronization signals such as the vertical synchronization signal VSync and the horizontal synchronization signal HSync from the acquired image signal. The image processing unit 160 generates a clock signal PCLK using a PLL (Phase Locked Loop) circuit or the like (not shown in the figure) according to the cycle of the separated vertical horizontal signal VSync and horizontal synchronization signal HSync.

The image processing unit 160 converts the analog signal, from which the synchronization signals are separated, into a digital image signal using an A/D conversion circuit (not shown in the figure). Thereafter, the image processing unit 160 stores the digital image signal after the conversion in the DRAM in the storing unit 120 frame by frame as image data Data (RGB data) of a target image. The image processing unit 160 may execute various kinds of image processing such as resolution conversion processing, various kinds of tone correction processing such as adjustment of luminance and chroma, and keystone correction on the image data Data according to necessity.

The image processing unit 160 transmits the generated clock signal PCLK, vertical synchronization signal VSync, and horizontal synchronization signal HSync and the image data Data stored in the DRAM in the storing unit 120 respectively via the transmitting units 51 and 52. The image data Data transmitted via the transmitting unit 51 is also referred to as "image data for right eye". The image data Data transmitted via the transmitting unit 52 is also referred to as "image data for left eye". The transmitting units 51 and 52 function as a transceiver for serial transmission between the control unit 10 and the image display unit 20.

The display control unit 190 generates control signals for controlling the right display driving unit 22 and the left display driving unit 24. Specifically, the display control unit 190 individually controls, using the control signals, ON/OFF of driving of the right LCD 241 by a right LCD control unit 211, ON/OFF of driving of a right backlight 221 by a right backlight control unit 201, ON/OFF of driving of a left LCD 242 by a left LCD control unit 212, and ON/OFF of driving of a left backlight 222 by a left backlight control unit 202 to thereby control generation and emission of image lights by the right display driving unit 22 and the left display driving unit 24. For example, the display control unit 190 causes both of the right display driving unit 22 and the left display driving unit 24 to generate image lights, causes one of the right display driving unit 22 and the left display driving unit 24 to generate image light, or causes neither of the right display driving unit 22 nor the left display driving unit 24 to generate image light.

The display control unit 190 transmits control signals to the right LCD control unit 211 and the left LCD control unit 212 respectively via the transmitting units 51 and 52. The display control unit 190 transmits control signals respectively to the right backlight control unit 201 and the left backlight control unit 202.

The sound processing unit 170 acquires a sound signal included in the contents, amplifies the acquired sound signal, and supplies the amplified sound signal to a speaker (not shown in the figure) in the right earphone 32 or a speaker (not shown in the figure) in the left earphone 34 connected to the coupling member 46. For example, when a Dolby (registered trademark) system is adopted, processing for the sound signal is performed. Different sounds, the frequencies or the like of which are varied, are respectively output from the right earphone 32 and the left earphone 34. The display-image coordination unit 142 is an application program for supporting the user in watching a game of baseball in the baseball stadium BS.

The interface 180 is an interface for connecting various external apparatuses OA, which are supply sources of contents, to the control unit 10. Examples of the external apparatuses OA include a personal computer, a cellular phone terminal, and a game terminal. As the interface 180, for example, a USB interface, a micro USB interface, or an interface for a memory card can be used.

The image display unit 20 includes the right display driving unit 22, the left display driving unit 24, the right light guide plate 261 functioning as the right optical-image display unit 26, the left light guide plate 262 functioning as the left optical-image display unit 28, and a nine-axis sensor 66.

Like the nine-axis sensor 139, the nine-axis sensor 66 is a motion sensor for detecting acceleration (three axes), angular velocity (three axes), and terrestrial magnetism (three axes). Since the nine-axis sensor 66 is provided in the image display unit 20, the nine-axis sensor 66 detects the movement of the head of the user when the image display unit 20 is mounted on the head of the user. A visual line direction of the user is estimated from the movement of the head of the user detected by the nine-axis sensor 66. The display-image coordination unit 142 of the control unit 10 supplies position information representing the present position of the control unit 10 detected by the GPS module 134 and visual line direction information representing the visual line direction of the user estimated by the nine-axis sensor 66 to the content server 300 via the radio communication unit 132. The nine-axis sensor 66 functions as a visual-line-direction estimating unit in the appended claims.

The right display driving unit 22 includes a receiving unit 53 (Rx 53), the right backlight control unit 201 (right BL control unit 201) and the right backlight 221 (right BL 221) functioning as a light source, the right LCD control unit 211 and the right LCD 241 functioning as a display element, and the right projection optical system 251. The right backlight control unit 201, the right LCD control unit 211, the right backlight 221, and the right LCD 241 are collectively referred to as "image-light generating unit" as well.

The receiving unit 53 functions as a receiver for serial transmission between the control unit 10 and the image display unit 20. The right backlight control unit 201 drives the right backlight 221 on the basis of an input control signal. The right backlight 221 is, for example, a light emitting body such as an LED or an electroluminescence (EL). The right LCD control unit 211 drives the right LCD 241 on the basis of the clock signal PCLK, the vertical synchronization signal VSync, the horizontal synchronization signal HSync, and image data for right eye Data1 input via the receiving unit 53. The right LCD 241 is a transmissive liquid crystal panel on which a plurality of pixels are arranged in a matrix shape.

The right projection optical system 251 is configured by a collimate lens that changes image light emitted from the right LCD 241 to light beams in a parallel state. The right light guide plate 261 functioning as the right optical-image display unit 26 guides the image light output from the right projection optical system 251 to a right eye RE of the user while reflecting the image light along a predetermined optical path. The right projection optical system 251 and the right light guide plate 261 are collectively referred to as "light guide unit" as well.

The left display driving unit 24 has a configuration same as the configuration of the right display driving unit 22. That is, the left display driving unit 24 includes a receiving unit 54 (Rx 54), the left backlight control unit 202 (left BL control unit 202) and the left backlight 222 (left BL 222) functioning as a light source, the left LCD control unit 212 and the left LCD 242 functioning as a display element, and the left projection optical system 252. The left backlight control unit 202, the left LCD control unit 212, the left backlight 222, and the left LCD 242 are collectively referred to as "image-light generating unit" as well. The left projection optical system 252 is configured by a collimate lens that changes image light emitted from the left LCD 242 to light beams in a parallel state. The left light guide plate 262 functioning as the left optical-image display unit 28 guides the image light output from the left projection optical system 252 to a left eye LE of the user while reflecting the image light along a predetermined optical path. The left projection optical system 252 and the left light guide plate 262 are collectively referred to as "light guide unit" as well.

Figure 4:
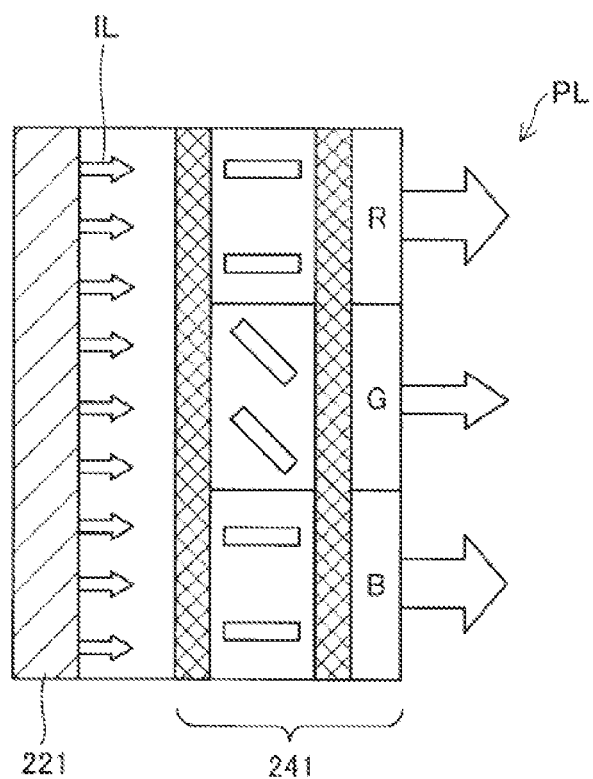
FIG. 4 is an explanatory diagram showing a state in which image light is emitted by an image-light generating unit.

FIG. 4 is an explanatory diagram showing a state in which image light is emitted by the image-light generating unit. The right LCD 241 drives liquid crystals in respective pixel positions arranged in a matrix shape to change the transmittance of light transmitted through the right LCD 241 to thereby modulate illumination light IL irradiated from the right backlight 221 into effective image light PL representing an image. The same applies to the left side. As shown in FIG. 4, in this embodiment, the backlight system is adopted. However, the image light may be emitted using a front light system or a reflection system.

A-3. Delivered Image Display Processing

Figure 5:
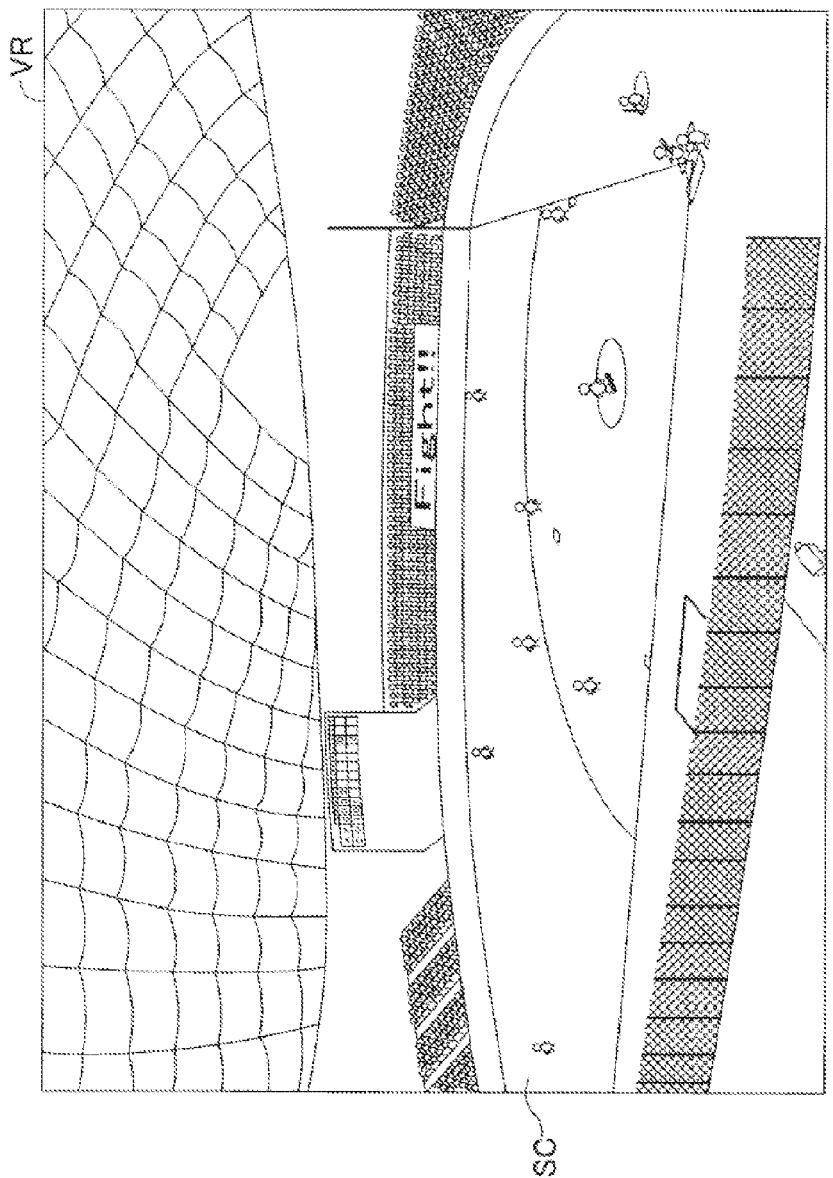
FIG. 5 is an explanatory diagram showing an example of a visual field visually recognized by a user.

FIG. 5 is an explanatory diagram showing an example of a visual field VR visually recognized by the user. In FIG. 5, the visual field VR visually recognized by a spectator SP1 (see FIG. 1), who is a user of the head-mounted display device 100, in the baseball stadium BS is shown. Since the image display unit 20 is the head-mounted display device 100 of the optical transmission type, the user can visually recognize an outside scene SC transmitted through the image display unit 20 in a state in which the user wears the image display unit 20 on the head. As shown in FIG. 5, the user is visually recognizing the outside scene SC such as the ground GR and the stand ST of the baseball stadium BS transmitted through the image display unit 20.

Figure 6:
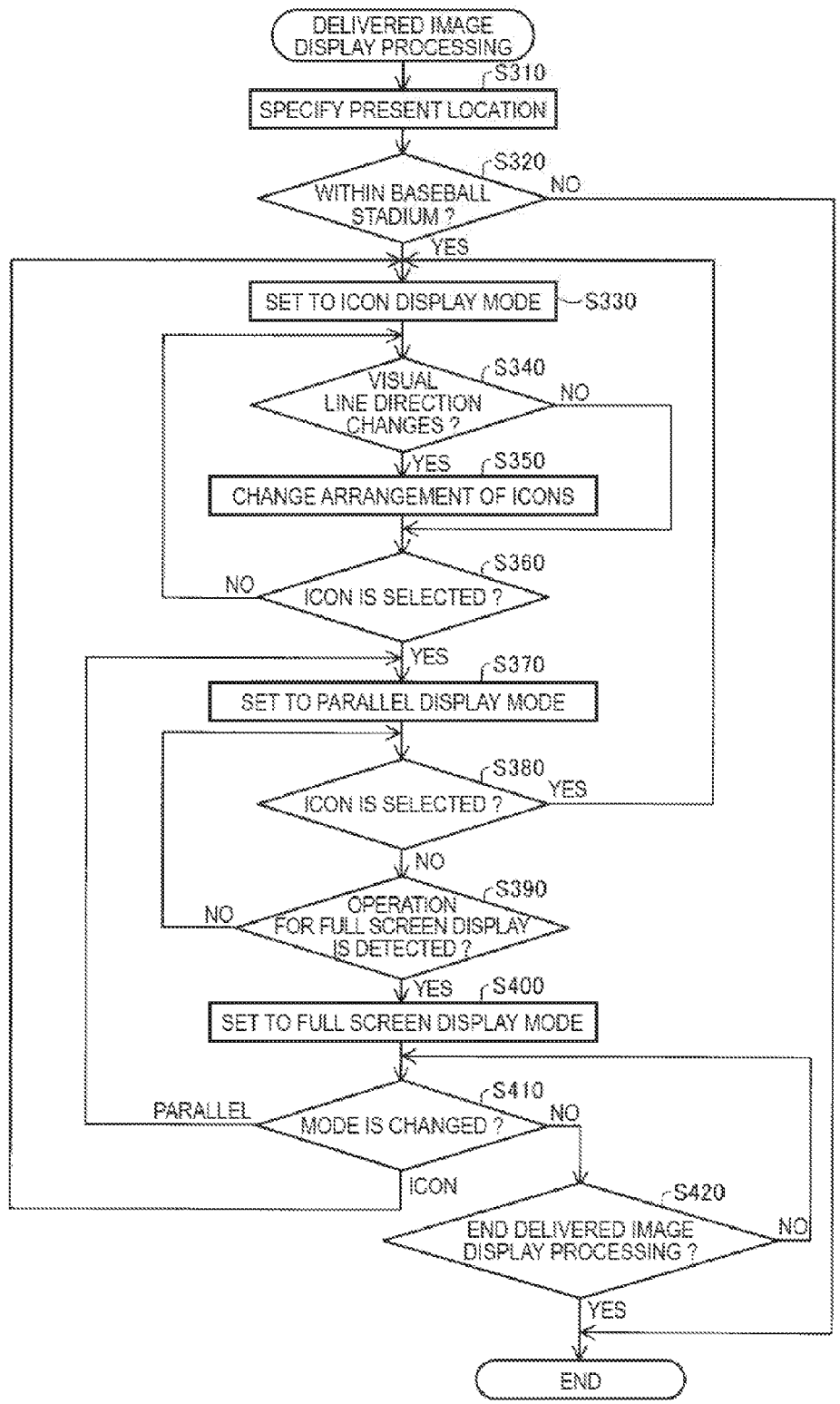
FIG. 6 is an explanatory diagram showing a flow of delivered image display processing.

FIG. 6 is an explanatory diagram showing a flow of delivered image display processing. In the processing shown in FIG. 6, the user of the head-mounted display device 100 performs predetermined operation, whereby a video (an image) delivered from the content server 300 is visually recognized by the user. The baseball stadium BS is equivalent to a specific geographical region in the appended claims.

First, the GPS module 134 of the control unit 10 specifies the present position of the user (step S310). Subsequently, the control unit 10 determines whether the specified present position is within the baseball stadium BS (step S320). The control unit 10 has stored therein in advance the position (the latitude and the longitude) of the specific geographical region such as the baseball stadium. BS including the content server 300 or the like that can deliver video information. Therefore, the control unit 10 can determine whether the specified present position is within the baseball stadium BS. When determining that the specified present position is not within the baseball stadium BS (NO in step S320), the control unit 10 ends the delivered image display processing. When determining that the present position is within the baseball stadium BS (YES in step S320), the control unit 10 sets an operation mode of the image display unit 20 to an icon display mode (step S330). The display-image coordination unit 142 of the control unit 10 transmits information indicating that the present position is within the baseball stadium BS to the content server 300 as a control signal. Upon receiving the control signal, the content server 300 transmits video information which is delivered to the display-image coordination unit 142. When the display-image coordination unit 142 receives the video information delivered from the content server 300, the control unit 10 sets the image display unit 20 to the icon display mode. In the icon display mode, the image display unit 20 displays a plurality of icon images. The video information delivered from the content server 300 is equivalent to specific information transmitted from the information apparatus in the appended claims. The display-image coordination unit 142 is equivalent to a signal transmitting unit and an information receiving unit in the appended claims.

Figure 7:
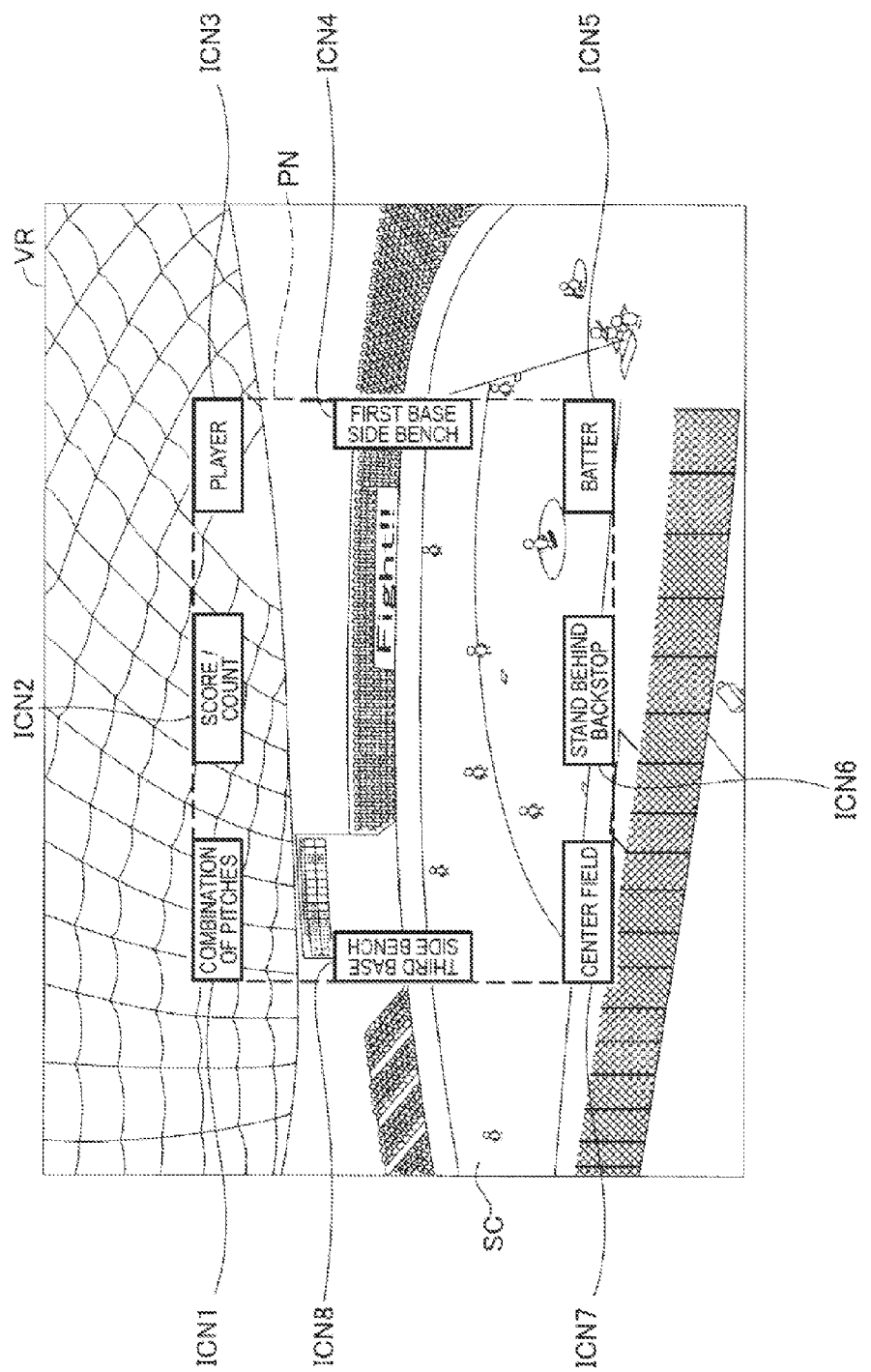
FIG. 7 is an explanatory diagram showing an example of the visual field visually recognized by the user in an icon display mode.

FIG. 7 is an explanatory diagram showing an example of the visual field VR visually recognized by the user in the icon display mode. As shown in FIG. 7, in the icon display mode, the user visually recognizes nine icons (hereinafter referred to as "icon group" as well) from an icon ICN1 to an icon ICN9 and the outside scene SC. The icon group is displayed in a peripheral section excluding the center in a region of a largest image display region PN, which is a largest region where the image display unit 20 can display an image. In this embodiment, the lateral and longitudinal numbers of pixels in the largest image display region PN are respectively 960 and 540. However, in other embodiments, the numbers of pixels may be different numbers of pixels. A dotted line indicating the outline of the largest image display region PN is shown for explaining this embodiment and is not actually displayed. Therefore, the user does not visually recognize the dotted line. The icon images such as the icon ICN1 and the icon ICN2 are equivalent to selectable images in the appended claims. The icon display mode is equivalent to a first mode in the appended claims. The largest image display region PN is equivalent to an image generable region in the appended claims.

In the icon display mode, subsequently, the control unit 10 monitors a change in a visual line direction of the user (step S340). The visual line direction of the user is estimated on the basis of the movement of the head of the user detected by the nine-axis sensor 66 of the image display unit 20. In the icon display mode, the arrangement of the icon images in the largest image display region PN is changed on the basis of the present position of the user and the visual line direction of the user with respect to the baseball stadium BS. For example, when the direction of the head changes by a degree equal to or more than a threshold set in advance, the change is detected as a change in the visual line direction (YES in step S340). The control unit 10 changes the arrangement of the icon images displayed in the largest image display region PN (step S350). When the change in the visual line direction is not detected (NO in step S340), the control unit 10 does not change the arrangement of the icon images displayed in the largest image display region PN.

Figure 8:
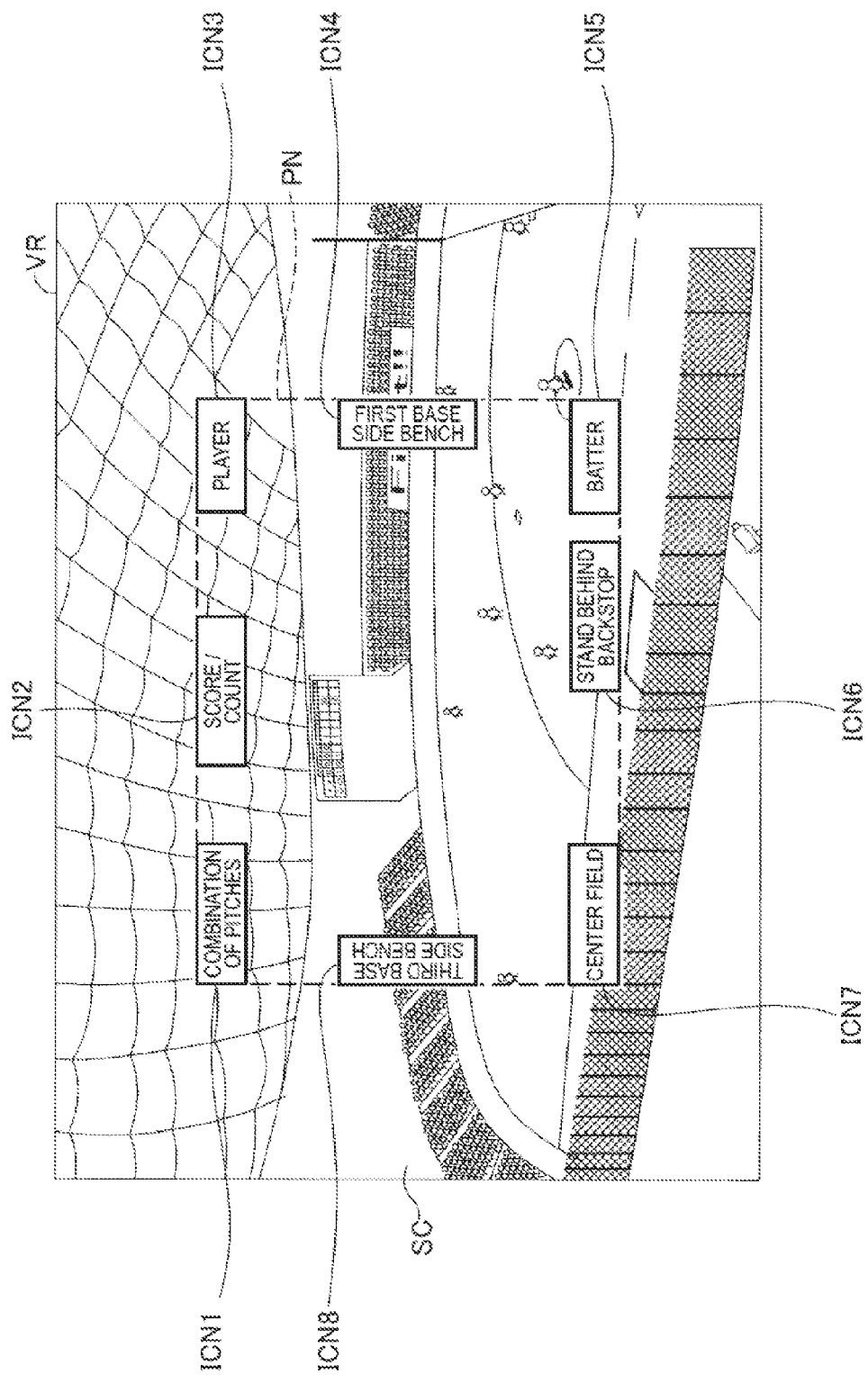
FIG. 8 is an explanatory diagram showing an example of the visual field visually recognized by the user in the icon display mode.

FIG. 8 is an explanatory diagram showing an example of the visual field VR visually recognized by the user in the icon display mode. In FIG. 8, the visual field VR visually recognized by the spectator SP1, who is watching a game of baseball, turns the visual line direction to the left without moving from the present position is shown. As shown in FIG. 8, according to a change in the visual line direction, the control unit 10 changes the arrangement of the icon images displayed in the largest image display region PN. Several icon images among the icon images displayed in the largest image display region PN are set in association with a specific position in the baseball stadium BS and displayed in a position close to the specific position in the largest image display region PN. In this embodiment, the icon ICN6 is set in association with the position of the stand behind the backstop in the baseball stadium BS. Therefore, as shown in FIG. 8, when the user changes the visual line direction to the left, the icon ICN6 is displayed further on the right side in the largest image display region PN than the position of the icon ICN6 shown in FIG. 7 before the change of the visual line direction.

When the arrangement of the icon images in the largest image display region PN is changed (step S350) or when a change in the visual line direction is not detected (NO in step S340), the control unit 10 monitors operation for selecting a specific icon image out of the icon group (step S360). When the nine-axis sensor 139 of the operation unit 135 detects a predetermined movement in the operation unit 135, the control unit 10 detects operation for selecting an icon image corresponding to the predetermined movement.

When the operation for selecting the icon image is not detected (NO in step S360), the control unit 10 continues to monitor a change in the visual line direction (step S340).

When, for example, acceleration in the lower left direction with respect to the gravity direction and the horizontal direction is detected as the operation for selecting the icon image (YES in step S360), the control unit 10 detects operation for selecting the icon ICN7 arranged on the lower left in the largest image display region PN and changes the operation mode of the image display unit 20 to a parallel display mode (step S370). In the parallel display mode, the icon group displayed in the icon display mode and a video (an image) associated with the selected icon ICN7 are displayed in the largest image display region PN. Videos associated with the icon images are equivalent to associated images in the appended claims.

Figure 9:
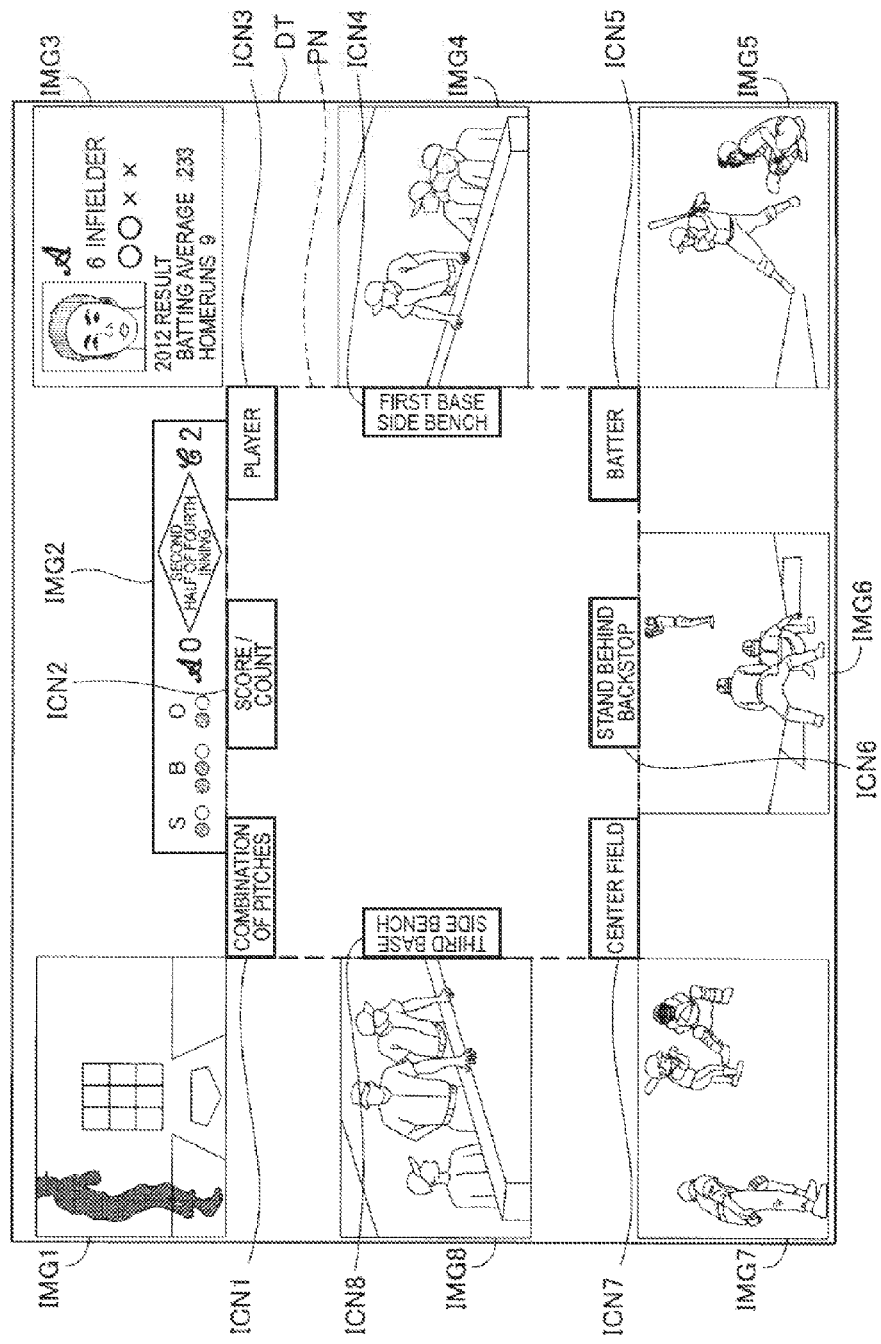
FIG. 9 is an explanatory diagram showing an example of a relation between icon images and videos associated with the icon images.

FIG. 9 is an explanatory diagram showing an example of a relation between the icon images and videos (images) associated with the icon images. In FIG. 9, image data generated by the control unit 10 is shown. The size of a region of the generated image data is an image data region DT. The control unit 10 stores, in a video memory, image data of apart corresponding to the size of the largest image display region PN from the image data region DT and transmits the stored image data to the image display unit 20. In the icon display mode, image data in the largest image display region PN in the image data region DT is transmitted to the image display unit 20. When the icon ICN7 is selected, the control unit 10 stores a video IMG7 associated with the icon ICN7 in the video memory such that the video IMG7 is displayed in a predetermined position in the largest image display region PN. The control unit 10 transmits the stored image data corresponding to the size of the largest image display region PN to the image display unit 20 and causes the image display unit 20 to display the image data in the largest image display region PN. In this embodiment, the lateral and longitudinal numbers of pixels of the image data region DT are respectively 1920 and 1080. However, in the other embodiments, the numbers of pixels may be different numbers of pixels. The image data generated by the control unit 10 is equivalent to large-region image data in the appended claims. The image data corresponding to the size of the largest image display region PN stored in the video memory is equivalent to image data for visual recognition in the appended claims.

Figure 10:
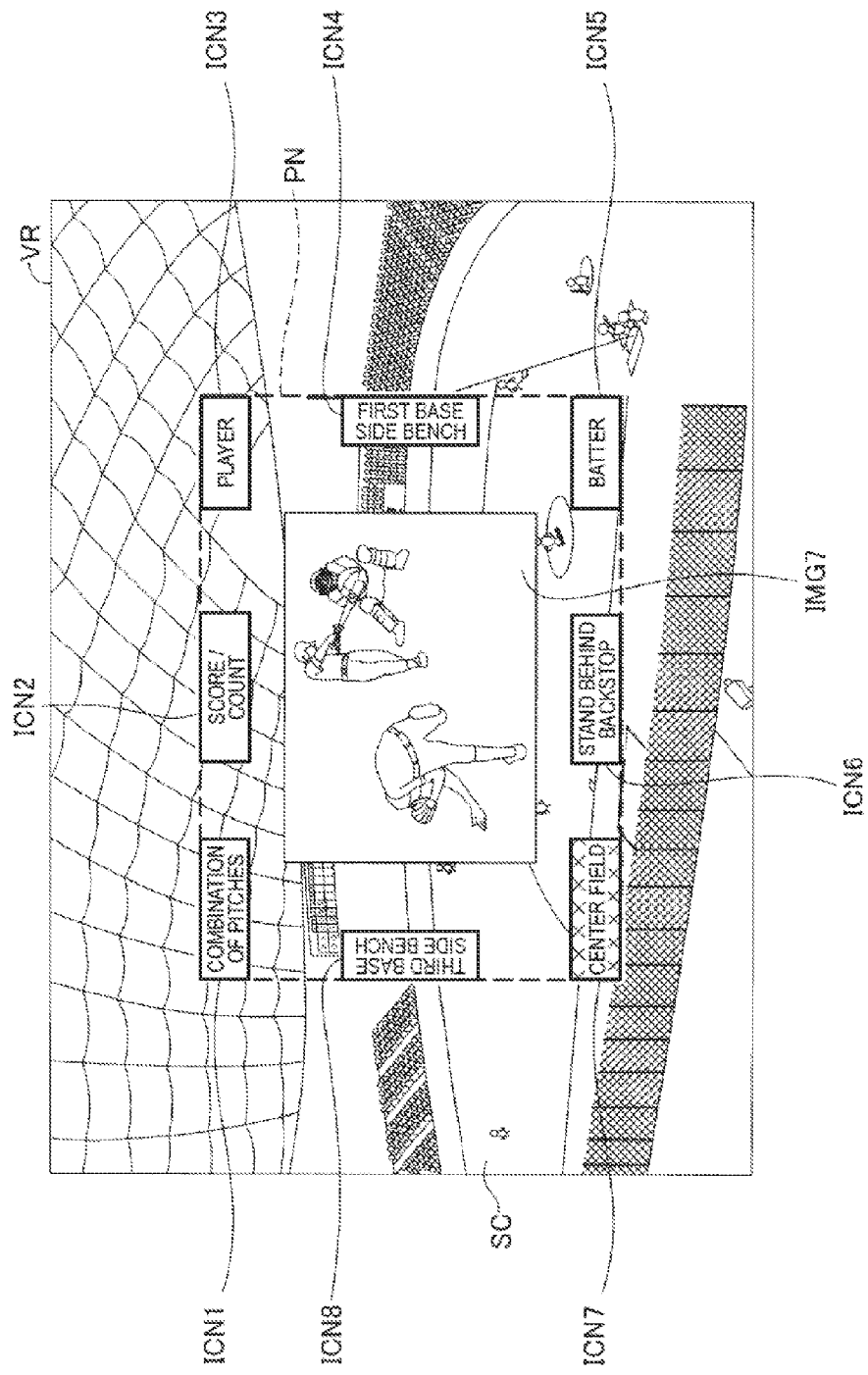
FIG. 10 is an explanatory diagram showing an example of the visual field visually recognized by the user in a parallel display mode.

FIG. 10 is an explanatory diagram showing an example of the visual field VR visually recognized by the user in the parallel display mode. As shown in FIG. 10, in the largest image display region PN, the icon group is arranged in the peripheral section. The video IMG7 is arranged in a position including the center other than the peripheral section. The video IMG7 is a real-time video seen from the "center field" side delivered from the content server 300. The video IMG7 is displayed in the largest image display region PN as an image larger than the icon ICN7. In the parallel display mode, the icon ICN7 is displayed in a flashing manner unlike the other icons in order to cause the user to visually recognize that the icon ICN7 is associated with the video IMG7 displayed in the center of the largest image display region PN. In FIG. 10, the icon ICN7 is indicated by hatching instead of the flashing display. The parallel display mode is equivalent to a second mode in the appended claims. When the control unit 10 has the first mode and the second mode, this means that the control unit 10 has the different first and second modes as the operation mode of the image display unit 20 and can switch the operation mode of the image display unit 20 between the first mode and the second mode. The center in the largest image display region PN in this embodiment means the lateral number of pixels 640 and the longitudinal number of pixels 360 located in the center respectively with respect to the lateral number of pixels 960 and the longitudinal number of pixels 540. It is more preferable that the center is the lateral number of pixels 480 and the longitudinal number of pixels 270 located in the center. The peripheral section in the largest image display region PN means a portion excluding the lateral number of pixels 480 and the longitudinal number of pixels 270 located in the center respectively in the lateral and longitudinal directions. It is more preferable that the peripheral section is a portion excluding the lateral number of pixels 640 and the longitudinal number of pixels 360 located in the center. In this embodiment, the center of the largest image display region PN and the center of the visual field VR of the user coincide with each other. However, in the other embodiments, the center of the largest image display region PN and the center of the visual field VR of the user do not have to coincide with each other. In the other embodiments, a region where the icon images are arranged may be set in the largest image display region PN.

As a method of causing the user to visually recognize the outside scene SC in a portion different from the portion where the icon images are displayed in the icon display mode and the portions where the icon images and the video IMG7 are displayed in the parallel display mode in the largest image display region PN, one of methods (1) and (2) described below can be used.

(1) When the icon images and the video IMG7 are stored in the video memory, the image processing unit 160 replaces pixel data other than portions corresponding to the icon images and the video IMG7 with black dummy dot data.

(2) When the icon images and the video IMG7 are stored in the video memory, the image processing unit 160 controls a signal (an Enable signal) for switching effectiveness and ineffectiveness of image light generated in a portion other than the portions corresponding to the icon images and the video IMG7. Specifically, the image processing unit 160 sets an output value of the Enable signal in the portions corresponding to the icon images and the video IMG7 to Hi (effective) and sets an output value of the Enable signal in the portion not corresponding to the icon images and the video IMG7 to Lo (ineffective).

Subsequently, the control unit 10 monitors operation for selecting any one of the icon images of the icon group (step S380 in FIG. 6). In the parallel display mode, when the operation for selecting any one of the icon images is detected (YES in step S380), the control unit 10 changes the operation mode of the image display unit 20 from the parallel display mode to the icon display mode (step S330).

When the operation for selecting any one of the icon images in the processing is not detected in step S380 (NO in step S380), the control unit 10 monitors operation for changing the video IMG7 to full screen display (step S390). When the operation for changing the video IMG7 to the full screen display is not detected (NO in step S390), the control unit 10 monitors the operation for selecting any one of the icon images of the icon group (step S380). When the operation for changing the video IMG7 to the full screen display is detected (YES in step S390), the control unit 10 sets the operation mode of the image display unit 20 to a full screen display mode (step S400).

Figure 11:
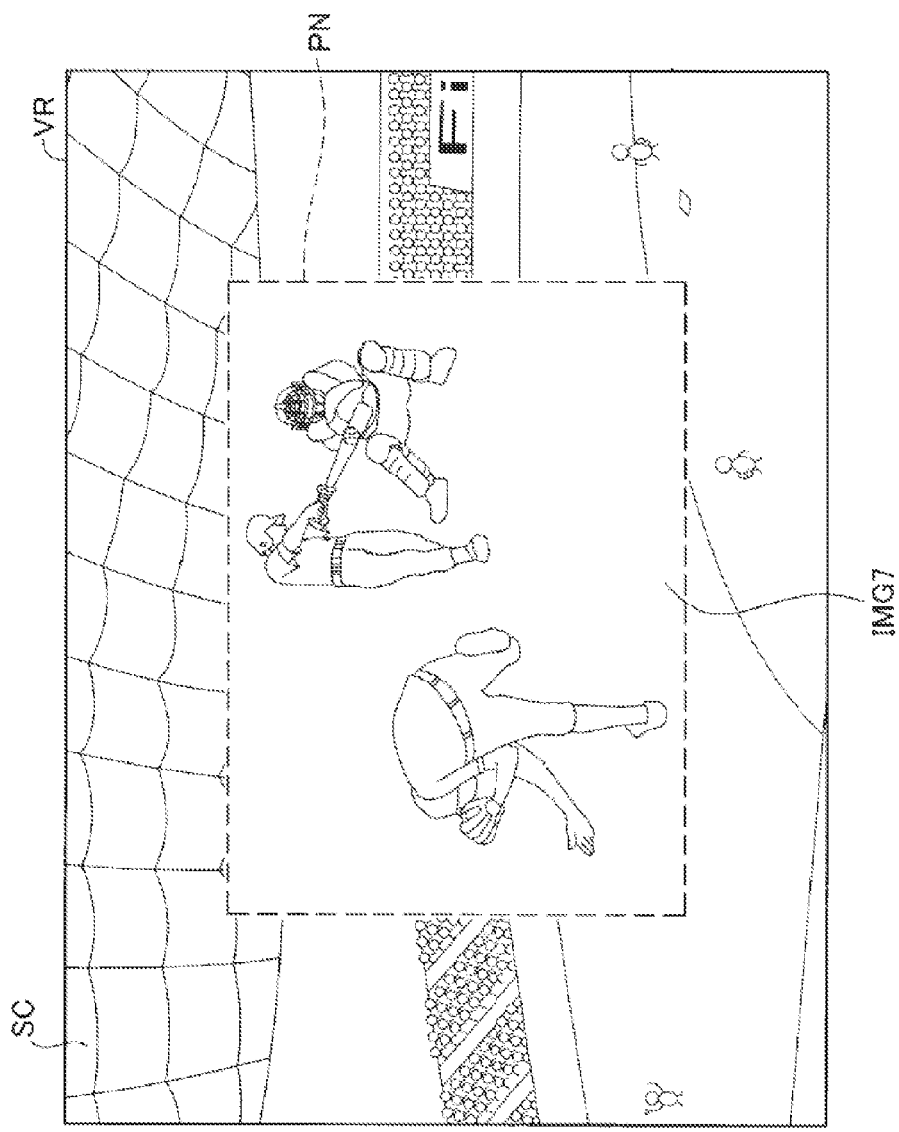
FIG. 11 is an explanatory diagram showing an example of the visual field visually recognized by the user in a full screen display mode.

FIG. 11 is an explanatory diagram showing an example of the visual field VR visually recognized by the user in the full screen display mode. As shown in FIG. 11, the control unit 10 displays the video IMG7 in the entire largest image display region PN and does not display the icon group. The full screen display mode is equivalent to a third mode in the appended claims.

Subsequently, the control unit 10 monitors operation for changing the operation mode of the image display unit 20 (step S410). When operation for changing the operation mode of the image display unit 20 to the parallel display mode is detected (PARALLEL in step S410), the control unit 10 changes the operation mode of the image display unit 20 from the full screen display mode to the parallel display mode (step S370). When the operation for changing the operation mode of the image display unit 20 to the icon display mode is detected in the processing in step S410 (ICON in step S410), the control unit 10 changes the operation mode of the image display unit 20 from the full screen display mode to the icon display mode (step S330).

When the operation for changing the operation mode of the image display unit 20 is not detected in the processing in step S410 (NO in step S410), the control unit 10 monitors operation for ending the delivered image display processing (step S420). When the operation for ending the delivered image display processing is not detected (NO in step S420), the control unit 10 continues to monitor the operation for changing the operation mode of the image display unit 20 (step S410). When the operation for ending the delivered image display processing is detected (YES in step S420), the control unit 10 ends the delivered image display processing and stops the display of the image displayed in the largest image display region PN.

As explained above, in the head-mounted display device 100 in this embodiment, the control unit 10 switches the operation mode of the image display unit 20 between the icon display mode and the parallel display mode. In the icon display mode, the icon group is displayed in the position other than the center of the largest image display region PN. In the icon display mode, when the icon ICN7 is selected by operation by the user, the control unit 10 sets the operation mode of the image display unit 20 to the parallel display mode for displaying the video IMG7 associated with the icon ICN7 as an image larger than the icon ICN7. Therefore, in the head-mounted display device 100, the user can switch the operation mode of the image display unit 20 according to an intention of the user and select an image that the user desires to watch. Further, the user can visually recognize the outside scene SC as well according to necessity. Therefore, convenience for the user is improved.

In the head-mounted display device 100 in this embodiment, in the parallel display mode, the video IMG7 associated with the icon ICN7 is displayed in the position including the center of the largest image display region PN. Therefore, the user can easily visually recognize the selected video IMG7 and convenience for the user is improved.

In the head-mounted display device 100 in this embodiment, when the present position of the user specified by the GPS module 134 is within the baseball stadium BS, the display-image coordination unit 142 transmits a control signal indicating that the present position is within the baseball stadium BS to the content server 300 and receives video information delivered from the content server 300. The video IMG7 associated with the icon ICN7 in the icon group is a video delivered from the content server 300. Therefore, in the head-mounted display device 100, when the user is present in a specific geographical region, it is possible to deliver a video related to the specific geographical region and cause the user to visually recognize the video. Accordingly, the user can visually recognize, according to the specified present position, a video related to the present position and convenience for the user is further improved.

In the head-mounted display device in this embodiment, when the present position of the user is within the baseball stadium BS, the control unit 10 changes the arrangement of the icon images in the largest image display region PN on the basis of a visual line direction of the user estimated by the nine-axis sensor 66. Therefore, in the head-mounted display device 100, since the arrangement of the icon images visually recognized by the user is associated with the specific geographical region, the user can sensuously recognize a relation between the position of the icon images and the outside scene SC and convenience for the user is improved.

In the head-mounted display device 100 in this embodiment, the icon ICN7 is selected out of the icon group on the basis of the movement of the operation unit 135 detected by the nine-axis sensor 139. Therefore, in the head-mounted display device 100, since the user can select an icon image out of the icon group with simple and sensuous operation without requiring complicated operation, convenience for the user is improved.

In the head-mounted display device 100 in this embodiment, in the icon display mode, the image processing unit 160 replaces a part of image data corresponding to a portion different from a portion where the icon images are visually recognized in the largest image display region PN with dummy data. In the parallel display mode, the image processing unit 160 replaces a part of image data corresponding to a portion different from portions where the icon images and the video IMG7 are visually recognized in the largest image display region PN with dummy data. In the head-mounted display device 100, in the largest image display region PN, the image processing unit 160 enables generation of image light in portions corresponding to the portion where the icon images are visually recognized in the icon display mode and the portions where the icon images and the video IMG7 are visually recognized in the parallel display mode. In the largest image display region PN, the image processing unit 160 disables generation of image light in portions corresponding to a portion where the ion images are not visually recognized in the icon display mode and portions where the icon images and the video IMG7 are not visually recognized in the parallel display mode. Therefore, in the head-mounted display device 100, in a portion other than the icon images and the video IMG7 in the largest image display region PN, the user can visually recognize the outside scene SC without visually recognizing an unnecessary image and convenience for the user is improved.

In the head-mounted display device 100 in this embodiment, the control unit 10 generates image data corresponding to the image data region DT larger than the largest image display region PN and transmits a part of the generated image data to the image display unit 20 as image data corresponding to a region having size equal to or smaller than the largest image display region PN. Therefore, in the head-mounted display device 100, the control unit 10 creates, as one image data, videos associated with the icon images. Therefore, when the icon ICN7 is selected out of the icon group, it is unnecessary to receive, every time the icon ICN7 is selected, an image delivered from the content server 300. It is possible to quickly display the video IMG7 in the largest image display region PN and convenience for the user is improved.

In the head-mounted display device 100 in this embodiment, image data transmitted from the control unit 10 to the image display unit 20 is image data corresponding to a region having size same as the size of the largest image display region PN. Therefore, the user can visually recognize the selected video IMG7 on a largest screen without performing unnecessary operation.

In the head-mounted display device 100 in this embodiment, in the icon display mode, the control unit 10 arranges the icon group in the peripheral section in the largest image display region PN. In the parallel display mode, the control unit 10 arranges the icon group in the peripheral section in the largest image display region PN and displays the video IMG7 associated with the icon ICN7 in a section other than the peripheral section in the largest image display region PN. Therefore, in the head-mounted display device 100, in the icon display mode, the user can visually recognize the outside scene SC in the center of the visual field and visually recognize the icon images in a position other than the center. Further, in the parallel display mode, the user can visually recognize both of the images of the icon group and the video IMG7 associated with the icon ICN7 selected out of the icon group at a time. Therefore, convenience for the user is improved.

In the head-mounted display device 100, in the parallel display mode, the icon ICN7 associated with the video IMG7 displayed in the center of the largest image display region PN is displayed to be different from the other icons. Therefore, in the parallel display mode, the user can easily recognize a relation between the video IMG7 and the icon ICN7 and convenience for the user is further improved.

The head-mounted display device 100 in this embodiment, the control unit 10 switches the operation mode of the image display unit 20 among the full screen display mode for displaying the video IMG7 in size same as the size of the largest image display region PN, the icon display mode, and the parallel display mode. Therefore, in the head-mounted display device 100, in the full screen display mode, since the video IMG7 is displayed in the entire largest image display region PN, a range of selection of a display form of an image displayed in the largest image display region PN increases and convenience for the user is further improved.

B. Modifications

The invention is not limited to the embodiment explained above. The invention can be carried out in various forms without departing from the spirit of the invention. For example, modifications explained below are possible.

B1. Modification 1

Figure 12:
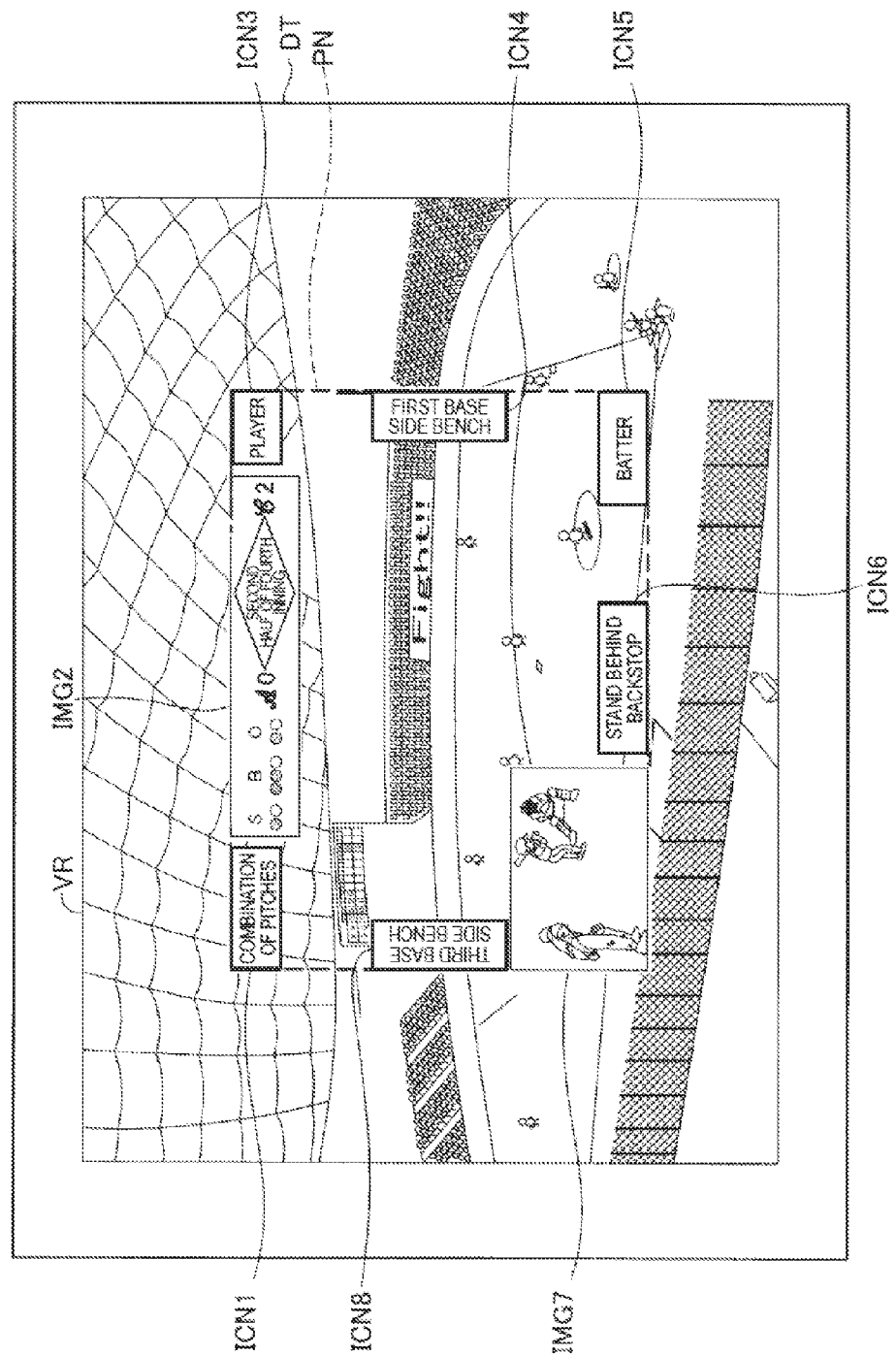
FIG. 12 is an explanatory diagram showing an example of the visual field visually recognized by the user in the icon display mode.

In the embodiment, the icon images are used as the images selected in the icon display mode. However, the images selected in the icon display mode are not limited to the icon images and can be variously modified. FIG. 12 is an explanatory diagram showing an example of the visual field VR visually recognized by the user in the icon display mode. In FIG. 12, unlike the icon display mode in the embodiment shown in FIG. 7, the video IMG7 is displayed instead of the icon ICN7 and the image IMG2 is displayed instead of the icon ICN2 in the largest image display region PN. In the head-mounted display device 100 in this modification, videos and images associated with the icon images are displayed instead of the icon images. Therefore, since the user can easily recognize relation between the icon images and the videos by vision, convenience for the user is improved.

In the embodiment, as the examples of the operation mode of the image display unit 20, the icon display mode, the parallel display mode, and the full screen display mode are described. However, forms of the operation mode are not limited to these modes and can be variously modified. For example, the operation mode of the image display unit 20 may be only two operation modes, i.e., the icon display mode and the parallel display mode or may be four or more operation modes.

B2. Modification 2

In the embodiment, in the parallel display mode, the video IMG7 is displayed in the position including the center in the largest image display region PN. However, the video IMG7 does not always need to be displayed in the position including the center. The position where the video IMG7 is displayed can be variously modified. For example, in the parallel display mode, the video IMG7 may be displayed in a position further on the left side than the center of the largest image display region PN as an image larger than the icon ICN7 in the icon display mode. When another icon image is additionally selected separately from the video IMG7 selected in the icon display mode, a video associated with the additionally selected icon image may be displayed separately from the video IMG7.

In the embodiment, the center of the largest image display region PN is the same as the center in the visual field VR of the user. However, the positional relation between the centers in the largest image display region PN and the visual field VR can be variously modified. For example, when a visual line direction is specified by a CCD camera, the center of the largest image display region PN is sometimes equivalent to the position at the right end or the lower end of the visual field VR. When the user of the head-mounted display device 100 attempts to visually recognize the left direction without moving the head, even the center of the largest image display region PN is sometimes equivalent to the right end of the visual field VR. When a position where the head-mounted display device 100 is mounted on the head of the user is shifted, even the center of the largest image display region PN is sometimes equivalent to the lower end or the like of the visual field VR. Even in this case, since the icon images are arranged in a position other than the center of the largest image display region PN, the user can select an image that the user desires to watch and can visually recognize the outside scene SC as well according to necessity. Therefore, convenience for the user is improved.

B3. Modification 3

In the embodiment, as the example of the specific geographical region, the baseball stadium BS is described. However, the specific geographical region does not always need to be the baseball stadium BS and can be variously modified. For example, the specific geographical region may be a soccer field or an athletic field or may be a museum or a lecture hall.

For example, in a state in which the user of the head-mounted display device 100 is a driver of an automobile and the head-mounted display device 100 is not mounted on the head of the user, a video obtained by photographing a portion at a dead angle for the user with a camera or the like may be set as a video associated with an icon image. Since selection of an icon image is performed according to the movement of the head detected by the nine-axis sensor 66, the user can visually recognize the video of the portion at the dead angle. In the head-mounted display device 100, since the user can visually recognize a portion that cannot be visually recognized in a state in which the head-mounted display device 100 is not mounted, it is possible to improve safety for the user. When the user of the head-mounted display device 100 is an owner of a restaurant, the user can visually recognize the inside of the restaurant, a kitchen, and a warehouse where stocks of food materials and the like are stored without taking the trouble to visit the sites. With the head-mounted display device 100, the user can visually recognize a plurality of workplaces without moving thereto. Therefore, convenience for the user is improved.

The head-mounted display device 100 can also be applied to an industrial purpose. For example, in a factory where a plurality of industrial machines are set, when the user of the head-mounted display device 100 is a worker who goes on patrol in the factory and performs inspection, an icon image displayed to be different according to operation states set in the respective machines in advance may be displayed in the largest image display region PN. When the user of the head-mounted display device 100 is a controller of a control tower who performs traffic control, if the user desires to watch a video in a remote place in detail, an enlarged image can be displayed in the largest image display area PN.

In the embodiment, the video information delivered from the content server 300 is the information representing a video or an image that can be visually recognized from a position different from the present position of the user in the baseball stadium BS. However, the information delivered from the content server 300 is not limited to this information and can be variously modified. For example, a replay video or a video representing a highlight scene may be delivered from the content server 300 rather than the real-time video such as the video IMG7. In a game of a baseball, a progress situation of a game in another baseball stadium may be delivered from the content server 300.

In the embodiment, when the present position specified by the GPS module 134 is within the baseball stadium BS, the display-image coordination unit 142 transmits a control signal to the content server 300 and receives an image delivered from the content server 300. However, a form of the delivery of a video from the content server 300 based on the specified present position can be variously modified. For example, when the display-image coordination unit 142 transmits a specific signal and the content server 300 receives the specific signal and determines on the basis of a positional relation between the specific signal and the baseball stadium BS that the head-mounted display device 100 is present within the baseball stadium BS, the content server 300 delivers video information to the display-image coordination unit 142. In the head-mounted display device 100 in this modification, even if the GPS module 134 is not mounted on the control unit 10, the display-image coordination unit 142 and the content server 300 recognize a mutual positional relation. The display-image coordination unit 142 can receive video information delivered from the content server 300.

B4. Modification 4

In the embodiment, in the icon display mode, the arrangement of the icon images in the largest image display region PN is changed on the basis of the present position of the user and the visual line direction of the user with respect to the baseball stadium BS. As the change of the arrangement of the icon images, the position of the icon ICN6 is changed. However, a form of the change of the arrangement of the icon images is not limited to this form and can be variously modified. For example, in the embodiment, since the spectator SP1, who is the user, is present in the stand ST on the third base side, the icon groups are arranged as shown in FIG. 7. On the other hand, when a spectator SP2 present in the stand ST on the first base side wears the head-mounted display device 100, the arrangement of the icon ICN4 of an image representing the "first base side bench" and the icon ICN8 of an image representing the "third base side bench" may be opposite to the arrangement in the largest image display region PN. The arrangement of the icon images may be changed according to the present position of the user and the visual line direction of the user with respect to the baseball stadium BS not only in the icon display mode but also in the parallel display mode.

In the embodiment, the visual line direction of the user is estimated by the nine-axis sensor 66 provided in the image display unit 20. However, a method of estimating the visual line direction of the user is not limited to this and can be variously modified. For example, the visual line direction of the user may be estimated by picking up an image of the eyes of the user with a CCD camera and analyzing the picked-up image.

B5. Modification 5

In the embodiment, the operation unit 135 is arranged in the control unit 10. However, a form of the operation unit 135 is not limited to this form and can be variously modified. For example, the operation unit 135 may be configured as an independent user interface. In this case, the operation unit 135 is not incorporated in the control unit 10. Therefore, it is possible to reduce the weight of the operation unit 135 and improve operability of the operation unit 135.

B6. Modification 6

In the embodiment, in the largest image display region PN, the image data in the portion other than the portions corresponding to the icon images and the video IMG7 is replaced with the black dummy dot data. However, replacing dummy data is not limited to black and can be variously modified. For example, image data in a peripheral portion surrounding the icon images may be replaced with red or blue dummy data. Image data in the other portions may be replaced with black dummy data. In the head-mounted display device 100 in this modification, the icon images are displayed in the largest image display region PN surrounded by a red or blue frame. Therefore, since the user can easily distinguish the outside scene SC and the icon images and can easily recognize the icon images, convenience and operability for the user are improved.

B7. Modification 7

In the embodiment, in the parallel display mode, since the icon ICN7 is associated with the video IMG7 displayed in the center of the largest image display region PN, unlike the other icon images, the icon ICN7 is displayed in the largest image display region PN in a flashing manner. However, a display form of the icon ICN7 can be variously modified. For example, the icon ICN7 may be displayed in a display form same as a display form of the other icon images. The icon images may be displayed to be different on the basis of contents of videos or still images delivered from the content server 300 and associated with the icon images.

In the embodiment, the form of the head-mounted display device 100 is explained. However, the invention can also be carried out not only as the form of the head-mounted display device 100 but also as a form of an image display system. For example, the image display system may include the content server 300 and the head-mounted display device 100 of the transmission type that causes a user to recognize, as a virtual image, a video delivered from the content server 300. In the head-mounted display device 100, when a present position specified by the GPS module 134 is within the baseball stadium BS, the display-image coordination unit 142 transmits a control signal to the content server 300. Upon receiving the control signal transmitted from the display-image coordination unit 142, the content server 300 delivers video information to the head-mounted display device 100. In the head-mounted display device 100, the display-image coordination unit 142 receives the delivered video information. The control unit 10 sets the operation mode of the image display unit 20 to the icon display mode. In the icon display mode, for example, when the icon ICN7 is selected, the control unit 10 causes the user to visually recognize the video IMG7, which represents the delivered video information, in size larger than the icon ICN7. In the image display system, the user can switch the operation mode of the image display unit 20 according to an intention of the user and select an image delivered from the content server 300. Further, the user can visually recognize the outside scene SC as well according to necessity. Therefore, convenience for the user is improved.

B8. Modification 8

For example, the image-light generating unit may include an organic EL (Organic Electro-Luminescence) display and an organic-EL control unit. For example, as the image-light generating unit, an LCOS (Liquid crystal on silicon; LCoS is a registered trademark), a digital micro mirror device, or the like can be used instead of the LCD. For example, the invention can also be applied to a head mounted display of a laser retina projection type. In the case of the laser retina projection type, "the region where image light can be emitted in the image-light generating unit" can be defined as an image region recognized by the eyes of the user.

For example, the head mounted display may be a head mounted display of a form in which the optical-image display unit covers only a part of the eye of the user, in other words, a form in which the optical-image display unit does not completely cover the eye of the user. The head mounted display may be a head mounted display of a monocular type. For example, in the head mounted display of the monocular type in which the optical-image display unit does not cover the eye of the user, the head mounted display may cause the user to visually recognize the icon images in a position other than the center of a generated image, which the user is caused to visually recognize, even if the position is not the position other than the center of the largest image display region PN.

As the earphone, an ear hook type or a headband type may be adopted. The earphone may be omitted. For example, the head mounted display may be configured as a head mounted display mounted on a vehicle such as an automobile or an airplane. The head mounted display may be configured as a head mounted display built in a body protector such as a helmet.

B9. Modification 9

The configuration of the head-mounted display device 100 in the embodiment is only an example and can be variously modified. For example, one of the direction key 16 and the track pad 14 provided in the control unit 10 may be omitted. Another interface for operation such as an operation stick may be provided in addition to the direction key 16 or the track pad 14 or instead of the direction key 16 or the track pad 14. Input devices such as a keyboard and a mouse may be connectable to the control unit 10. The control unit 10 may receive inputs from the keyboard and the mouse.

As the image display unit, an image display unit of another type such as an image display unit worn like a cap may be adopted instead of the image display unit 20 worn like eyeglasses. The earphones 32 and 34 and a camera 61 can be omitted as appropriate. In the embodiment, as the components for generating image light, the LCDs and the light source are used. However, another display element such as an organic EL display may be adopted. In the embodiment, the nine-axis sensor 66 is used as the sensor for detecting the movement of the head of the user. However, a sensor configured by one or two of an acceleration sensor, an angular velocity sensor, and a terrestrial magnetism sensor may be used instead of the nine-axis sensor 66. In the embodiment, the head-mounted display device 100 is the optical transmission type of the binocular type. However, the invention can also be applied to head-mounted display devices of other types such as a video transmission type and the monocular type.

In the embodiment, the head-mounted display device 100 may guide image lights representing the same image to the left and right eyes of the user and cause the user to visually recognize a two-dimensional image. The head-mounted display device 100 may guide image lights representing different images to the left and right eyes of the user and cause the user to visually recognize a three-dimensional image.

In the embodiment, apart of the components realized by hardware may be replaced with software. Conversely, apart of the components realized by software may be replaced with hardware. For example, in the embodiment, the image processing unit 160 and the sound processing unit 170 are realized by the CPU 140 reading out and executing the computer program. However, these functional units may be realized by a hardware circuit.

When a part or all of the functions of the invention are realized by software, the software (a computer program) can be provided while being stored in a computer-readable recording medium. In the invention, the "computer-readable recording medium" is not limited to a portable recording medium such as a flexible disk or a CD-ROM and also includes various internal storage devices in a computer such as a RAM and a ROM and external storage devices fixed to the computer such as a hard disk.

In the embodiment, as shown in FIGS. 2 and 3, the control unit 10 and the image display unit 20 are formed as separate components. However, the configurations of the control unit 10 and the image display unit 20 are not limited to this and can be variously modified. For example, all the components formed in the control unit 10 may be formed on the inside of the image display unit 20 or apart of the components may be formed on the inside of the image display unit 20. Only the operation unit 135 among the components formed in the control unit 10 may be formed as an independent user interface (UI). The power supply 130 in the embodiment may be independently formed to be replaceable. The components formed in the control unit 10 may be redundantly formed in the image display unit 20. For example, the CPU 140 shown in FIG. 2 may be formed in both of the control unit 10 and the image display unit 20. Functions performed by the CPU 140 formed in the control unit 10 and the CPU formed in the image display unit 20 may be separated from each other.

The control unit 10 may be incorporated in a personal computer (PC) and the image display unit 20 may be used instead of a monitor of the PC. The control unit 10 and the image display unit 20 may be integrated as a wearable computer that can be attached to clothes of the user.

The invention is not limited to the embodiment and the modifications and can be realized in various configurations without departing from the spirit of the invention. For example, the technical features in the embodiment and the modifications corresponding to the technical features in the aspects described in the section of the summary of the invention can be replaced or combined as appropriate in order to solve a part or all of the problems or attain a part or all of the effects. Unless the technical features are explained as essential features in this specification, the technical features can be deleted as appropriate.

The entire disclosure of Japanese Patent Application No. 2013-004485, filed Jan. 15, 2013 is expressly incorporated by reference herein.

What is claimed is:

1. A head-mounted display device of a transmission type comprising:
   an operation unit configured to receive an operation;
   a control unit configured to transmit image data; and
   an image display unit configured to cause, in a state in which the image display unit is mounted on a head of a user, the user to visually recognize a generated image generated on the basis of the image data transmitted from the control unit,
   wherein:
      the control unit has, as an operation mode of the image display unit, a first mode for causing the user to visually recognize a plurality of selectable images in positions other than a center in an image generable region, which is a region where the image display unit can generate the generated image, and a second mode for causing, when a singularity of the selectable image is selected out of the plurality of selectable images on the basis of the operation, the user to visually recognize an associated image associated with the one selectable image as an image larger than the one selectable image in the first mode, and
      the control unit replaces, among the image data, in the first mode, a portion corresponding to a region different from a region where the selectable image is visually recognized in the image generable region with dummy data and replaces, in the second mode, a portion corresponding to a region different from a region where the associated image and the selectable image are visually recognized in the image generable region with dummy data.

2. The head-mounted display device according to claim 1, wherein the control unit causes the user to visually recognize, in the second mode, the associated image in a position including the center in the image generable region.

3. The head-mounted display device according to claim 1, further comprising:
   a position detecting unit configured to detect a present position;
   a signal transmitting unit configured to transmit a control signal to an information apparatus when the present position detected by the position detecting unit is within a specific geographical region; and
   an information receiving unit configured to receive specific information transmitted from the information apparatus that receives the control signal, wherein
   at least one of a plurality of associated images associated with the plurality of selectable images is an image representing the specific information.

4. The head-mounted display device according to claim 1, further comprising:
   a signal transmitting unit configured to transmit a specific signal; and
   an information receiving unit configured to receive the specific signal transmitted from the signal transmitting unit and, when an information apparatus determines on the basis of the specific signal that a present position of the head-mounted display device is within a specific geographical region, receive specific information transmitted by the information apparatus, wherein
   at least one of a plurality of associated images associated with the plurality of selectable images is an image representing the specific information.

5. The head-mounted display device according to claim 1, further comprising:
   a position detecting unit configured to detect a present position; and
   a visual-line-direction estimating unit configured to estimate a visual line direction of the user, wherein
   when the present position detected by the position detecting unit is within a specific geographical region, the control unit changes an arrangement of the selectable images in the image generable region on the basis of the visual line direction and the present position.

6. The head-mounted display device according to claim 1, further comprising a movement detecting unit configured to detect movement of the operation unit, wherein
   the operation is the movement of the operation unit detected by the movement detecting unit.

7. The head-mounted display device according to claim 1, further comprising an image-light generating unit configured to generate image light, which represents an image, on the basis of the image data transmitted from the control unit, wherein the image display unit emits the image light to eyes of the user and causes the user to visually recognize the generated image, and the control unit does not cause, in the first mode, the image-light generating unit to generate the image light in a portion corresponding to a region different from a region where the selectable image is visually recognized in the image generable region and does not cause, in the second mode, the image-light-generating unit to generate the image light in a portion corresponding to a region different from a region where the associated image and the selectable image are visually recognized in the image generable region.

8. The head-mounted display device according to claim 1, wherein the control unit further generates large-region image data corresponding to a region larger than the image generable region, extracts a part of the large-region image data, and transmits image data for visual recognition corresponding to a region having size equal to or smaller than size of the image generable region to the image display unit.

9. The head-mounted display device according to claim 8, wherein the image data for visual recognition is image data corresponding to a region having size same as the size of the image generable region.

10. The head-mounted display device according to claim 1, wherein the control unit arranges, in the first mode, the selectable image in a peripheral section in the image generable region and arranges, in the second mode, the selectable image in the peripheral section in the image generable region and arranges the associated image in a position including the center other than the peripheral section in the image generable region.

11. The head-mounted display device according to claim 10, wherein the control unit causes, in the second mode, the image display unit to display the one selectable image associated with the associated image arranged in the image generable region to be different from the other selectable images.

12. The head-mounted display device according to claim 10, wherein the control unit has, as the operation mode, a third mode for arranging the associated image to be a region having size same as size of the image generable region, the first mode, and the second mode.

13. An image display system comprising:
an information apparatus; and
a head-mounted display device of a transmission type that causes a user to visually recognize an image representing specific information transmitted from the information apparatus,
wherein:
the head-mounted display device includes
a position detecting unit configured to detect a present position; and
a signal transmitting unit configured to transmit a control signal to the information apparatus when the present position detected by the position detecting unit is within a specific geographical region, upon receiving the control signal transmitted from the signal transmitting unit, the information apparatus transmits the specific information to the head-mounted display device, the head-mounted display device further includes:
an information receiving unit configured to receive the specific information transmitted from the information apparatus; and
a control unit having, as an operation mode for causing the user to visually recognize an image generated on the basis of image data, a first mode for causing the user to visually recognize a plurality of selectable images in positions other than the center in an image generable region, which is a region where the head-mounted display device can generate the image and a second mode for causing, when a singularity of the selectable image is selected out of the plurality of selectable images on the basis of an operation, the user to visually recognize an associated image associated with the one selectable image and representing the specific information as an image larger than the one selectable image in the first mode, and the control unit replaces, among the image data, in the first mode, a portion corresponding to a region different from a region where the selectable image is visually recognized in the image generable region with dummy data and replaces, in the second mode, a portion corresponding to a region different from a region where the associated image and the selectable image are visually recognized in the image generable region with dummy data.

14. A control method for a head-mounted display device of a transmission type including an operation unit configured to receive an operation, a control unit configured to transmit image data, and an image display unit configured to cause, in a state in which the image display unit is mounted on a head of a user, the user to visually recognize a generated image generated on the basis of the image data transmitted from the control unit, the control method comprising:

having, as an operation mode of the image display unit, a first mode for causing the user to visually recognize a plurality of selectable images in positions other than a center in an image generable region, which is a region where the image display unit can generate the generated image, and a second mode for causing, when a singularity of the selectable image is selected out of the plurality of selectable images on the basis of the operation, the user to visually recognize an associated image associated with the one selectable image as an image larger than the one selectable image in the first mode, replacing, among the image data, in the first mode, a portion corresponding to a region different from a region where the selectable image is visually recognized in the image generable region with dummy data, and replacing, in the second mode, a portion corresponding to a region different from a region where the associated image and the selectable image are visually recognized in the image generable region with dummy data.

* * * * *